(12) United States Patent
McDonald et al.

(10) Patent No.: US 8,189,472 B2
(45) Date of Patent: May 29, 2012

(54) OPTIMIZING BANDWIDTH UTILIZATION TO A SUBSCRIBER PREMISES

(76) Inventors: James F. McDonald, Atlanta, GA (US); Arturo A. Rodriguez, Norcross, GA (US); Luis Avila, Suwanee (ES); William E. Wall, Lawrenceville, GA (US)

( * ) Notice: Subject to any disclaimer, the term of this patent is extended or adjusted under 35 U.S.C. 154(b) by 794 days.

(21) Appl. No.: 11/162,345

(22) Filed: Sep. 7, 2005

(65) Prior Publication Data

US 2007/0053293 A1   Mar. 8, 2007

(51) Int. Cl.
  *G01R 31/08* (2006.01)
  *H04J 1/16* (2006.01)
(52) U.S. Cl. ............ 370/235; 370/395.41; 370/236; 370/468; 375/240.26; 375/240.01; 375/240.21; 725/100; 725/81
(58) Field of Classification Search .......... 370/235, 370/395.41, 236, 395.43, 468; 375/240.26, 375/240.01, 240.21; 358/3.06; 725/100, 725/81, 131, 151; 341/51; 348/180
See application file for complete search history.

(56) References Cited

U.S. PATENT DOCUMENTS

| | | |
|---|---|---|
| 3,676,580 A | 7/1972 | Beck |
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Muller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |

(Continued)

FOREIGN PATENT DOCUMENTS

CA   2 363 052 A1   11/1995

(Continued)

OTHER PUBLICATIONS

"A Brief History of the Trailer," http://www.movietrailertrash.com/views/history.html, 11 pages (Publicly known at least as early as Dec. 20, 2003).

(Continued)

*Primary Examiner* — Kwang B Yao
*Assistant Examiner* — Jamal Javaid
(74) *Attorney, Agent, or Firm* — Merchant & Gould

(57) ABSTRACT

Optimizing data rates for video services on a broadband network. Different data rates can be delivered to a subscriber premises depending on the size of the display screen connected to a set-top box, the type of content being requested, or whether there is real-time viewing. Therefore, the data rate can be optimized to maximize the number of video streams that can be delivered to any one subscriber without causing a perceived reduction in video picture quality.

9 Claims, 6 Drawing Sheets

U.S. PATENT DOCUMENTS

| | | |
|---|---|---|
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,485,216 A * | 1/1996 | Lee .............................. 348/443 |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,568,272 A | 10/1996 | Levine |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,176 A | 12/1997 | Bruette et al. |
| 5,694,546 A | 12/1997 | Reisman |
| 5,699,107 A | 12/1997 | Lawler et al. |
| 5,715,169 A | 2/1998 | Noguchi |
| 5,715,515 A | 2/1998 | Akins, III et al. |
| 5,721,827 A | 2/1998 | Logan et al. |
| 5,721,829 A | 2/1998 | Dunn |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,906 A | 1/1999 | Dunn et al. |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,978,043 A | 11/1999 | Blonstein et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |

| | | | | | | |
|---|---|---|---|---|---|---|
| 6,008,803 | A | 12/1999 | Rowe et al. | 6,292,624 | B1 | 9/2001 | Saib et al. |
| 6,008,836 | A | 12/1999 | Bruck et al. | 6,305,019 | B1 | 10/2001 | Dyer et al. |
| 6,014,184 | A | 1/2000 | Knee et al. | 6,311,011 | B1 | 10/2001 | Kuroda |
| 6,014,694 | A | 1/2000 | Aharoni et al. | 6,314,572 | B1 | 11/2001 | LaRocca et al. |
| 6,016,348 | A | 1/2000 | Blatter et al. | 6,314,573 | B1 | 11/2001 | Gordon et al. |
| 6,018,359 | A | 1/2000 | Kermode | 6,314,575 | B1 | 11/2001 | Billock et al. |
| 6,018,372 | A | 1/2000 | Etheredge | 6,317,777 | B1 | 11/2001 | Skarbo et al. |
| 6,020,912 | A | 2/2000 | De Lang | 6,317,885 | B1 | 11/2001 | Fries |
| 6,023,267 | A | 2/2000 | Chapuis et al. | 6,323,911 | B1 | 11/2001 | Schein et al. |
| 6,025,837 | A | 2/2000 | Matthews, III et al. | 6,327,628 | B1 | 12/2001 | Anuff et al. |
| 6,025,868 | A | 2/2000 | Russo | 6,335,936 | B1 | 1/2002 | Bossemeyer et al. |
| 6,025,869 | A | 2/2000 | Stas et al. | 6,347,400 | B1 | 2/2002 | Ohkura et al. |
| 6,026,376 | A | 2/2000 | Kenney | 6,349,410 | B1 | 2/2002 | Lortz |
| 6,035,281 | A | 3/2000 | Crosskey et al. | 6,353,448 | B1 | 3/2002 | Scarborough et al. |
| 6,037,933 | A | 3/2000 | Blonstein et al. | 6,357,046 | B1 | 3/2002 | Thompson et al. |
| 6,049,831 | A | 4/2000 | Gardell et al. | 6,359,636 | B1 | 3/2002 | Schindler et al. |
| 6,057,872 | A | 5/2000 | Candelore | 6,360,367 | B1 | 3/2002 | Yamamoto |
| 6,061,097 | A | 5/2000 | Satterfield | 6,362,841 | B1 | 3/2002 | Nykanen |
| 6,064,380 | A | 5/2000 | Swenson et al. | 6,367,078 | B1 | 4/2002 | Lasky |
| 6,064,980 | A | 5/2000 | Jacobi et al. | 6,378,130 | B1 | 4/2002 | Adams |
| 6,070,186 | A | 5/2000 | Nishio | 6,381,332 | B1 | 4/2002 | Glaab |
| 6,072,982 | A | 6/2000 | Haddad | 6,385,614 | B1 | 5/2002 | Vellandi |
| 6,073,105 | A | 6/2000 | Sutcliffe et al. | 6,393,585 | B1 | 5/2002 | Houha et al. |
| 6,075,575 | A | 6/2000 | Schein et al. | 6,396,549 | B1 | 5/2002 | Weber |
| 6,081,263 | A | 6/2000 | LeGall et al. | 6,400,280 | B1 | 6/2002 | Osakabe |
| 6,085,185 | A | 7/2000 | Matsuzawa et al. | 6,401,243 | B1 | 6/2002 | Suzuki |
| 6,094,680 | A | 7/2000 | Hokanson | 6,405,239 | B1 | 6/2002 | Addington et al. |
| 6,097,383 | A | 8/2000 | Gaughan et al. | 6,421,067 | B1 | 7/2002 | Kamen et al. |
| 6,098,082 | A | 8/2000 | Gibbon et al. | 6,429,899 | B1 * | 8/2002 | Nio et al. ................. 348/443 |
| 6,101,512 | A | 8/2000 | DeRose et al. | 6,434,748 | B1 | 8/2002 | Shen et al. |
| 6,108,002 | A | 8/2000 | Ishizaki | 6,441,862 | B1 | 8/2002 | Yuen et al. |
| 6,108,042 | A | 8/2000 | Adams et al. | 6,442,332 | B1 | 8/2002 | Knudson et al. |
| 6,118,445 | A | 9/2000 | Nonomura et al. | 6,442,755 | B1 | 8/2002 | Lemmons et al. |
| 6,118,976 | A | 9/2000 | Arias et al. | 6,442,756 | B1 | 8/2002 | Durden et al. |
| 6,124,878 | A | 9/2000 | Adams et al. | 6,446,261 | B1 | 9/2002 | Rosser |
| 6,125,259 | A | 9/2000 | Perlman | 6,446,262 | B1 | 9/2002 | Malaure et al. |
| 6,133,909 | A | 10/2000 | Schein et al. | 6,460,181 | B1 | 10/2002 | Donnelly |
| 6,137,539 | A | 10/2000 | Lownes et al. | 6,463,585 | B1 | 10/2002 | Hendricks et al. |
| 6,138,139 | A | 10/2000 | Beck et al. | 6,476,833 | B1 | 11/2002 | Moshfeghi |
| 6,141,003 | A | 10/2000 | Chor et al. | 6,480,669 | B1 | 11/2002 | Tsumagari et al. |
| 6,141,488 | A | 10/2000 | Knudson et al. | 6,481,010 | B2 | 11/2002 | Nishikawa et al. |
| 6,145,083 | A | 11/2000 | Shaffer et al. | 6,481,011 | B1 | 11/2002 | Lemmons |
| 6,148,332 | A | 11/2000 | Brewer et al. | 6,486,920 | B2 | 11/2002 | Arai et al. |
| 6,151,059 | A | 11/2000 | Schein et al. | 6,501,902 | B1 | 12/2002 | Wang |
| 6,157,377 | A | 12/2000 | Shah-Nazaroff et al. | 6,505,348 | B1 | 1/2003 | Knowles et al. |
| 6,157,413 | A | 12/2000 | Hanafee et al. | 6,507,949 | B1 | 1/2003 | Jonason et al. |
| 6,160,546 | A | 12/2000 | Thompson et al. | 6,510,556 | B1 | 1/2003 | Kusaba et al. |
| 6,160,989 | A | 12/2000 | Hendricks et al. | 6,515,680 | B1 | 2/2003 | Hendricks et al. |
| 6,163,272 | A | 12/2000 | Goode et al. | 6,515,710 | B1 | 2/2003 | Koshimuta |
| 6,166,730 | A | 12/2000 | Goode et al. | 6,519,770 | B2 | 2/2003 | Ford |
| 6,169,543 | B1 | 1/2001 | Wehmeyer | 6,526,575 | B1 | 2/2003 | McCoy et al. |
| 6,172,674 | B1 | 1/2001 | Etheredge | 6,526,577 | B1 | 2/2003 | Knudson et al. |
| 6,172,677 | B1 | 1/2001 | Stautner et al. | 6,532,589 | B1 | 3/2003 | Proehl et al. |
| 6,177,931 | B1 | 1/2001 | Alexander et al. | 6,536,041 | B1 | 3/2003 | Knudson et al. |
| 6,181,333 | B1 | 1/2001 | Chaney et al. | 6,539,548 | B1 | 3/2003 | Hendricks et al. |
| 6,181,693 | B1 | 1/2001 | Maresca | 6,543,053 | B1 | 4/2003 | Li et al. |
| 6,182,287 | B1 | 1/2001 | Schneidewend et al. | 6,545,669 | B1 | 4/2003 | Kinawi et al. |
| 6,184,877 | B1 | 2/2001 | Dodson et al. | 6,557,030 | B1 | 4/2003 | Hoang |
| 6,188,684 | B1 | 2/2001 | Setoyama et al. | 6,563,515 | B1 | 5/2003 | Reynolds et al. |
| 6,195,689 | B1 | 2/2001 | Bahlmann | 6,564,378 | B1 | 5/2003 | Satterfield et al. |
| 6,201,540 | B1 | 3/2001 | Gallup et al. | 6,564,379 | B1 | 5/2003 | Knee et al. |
| 6,205,485 | B1 | 3/2001 | Kikinis | 6,564,383 | B1 | 5/2003 | Combs et al. |
| 6,208,335 | B1 | 3/2001 | Gordon et al. | 6,571,390 | B1 | 5/2003 | Dunn et al. |
| 6,209,130 | B1 | 3/2001 | Rector et al. | 6,574,793 | B1 | 6/2003 | Ngo et al. |
| 6,216,264 | B1 | 4/2001 | Maze et al. | 6,578,077 | B1 | 6/2003 | Rakoshitz et al. |
| 6,238,290 | B1 | 5/2001 | Tarr et al. | 6,594,699 | B1 | 7/2003 | Sahai et al. |
| 6,239,845 | B1 | 5/2001 | Itagaki et al. | 6,594,825 | B1 | 7/2003 | Goldschmidt Iki et al. |
| 6,240,555 | B1 | 5/2001 | Shoff et al. | 6,600,496 | B1 | 7/2003 | Wagner et al. |
| 6,243,142 | B1 | 6/2001 | Mugura et al. | 6,604,240 | B2 | 8/2003 | Ellis et al. |
| 6,249,532 | B1 | 6/2001 | Yoshikawa et al. | 6,609,253 | B1 | 8/2003 | Swix et al. |
| 6,253,375 | B1 | 6/2001 | Gordon et al. | 6,611,958 | B1 | 8/2003 | Shintani et al. |
| 6,259,733 | B1 | 7/2001 | Kaye | 6,614,440 | B1 | 9/2003 | Bowen et al. |
| 6,266,814 | B1 | 7/2001 | Lemmons et al. | 6,614,988 | B1 | 9/2003 | Sampsell |
| 6,268,849 | B1 | 7/2001 | Boyer et al. | 6,628,302 | B2 | 9/2003 | White et al. |
| 6,272,484 | B1 | 8/2001 | Martin et al. | 6,631,413 | B1 | 10/2003 | Aggarwal et al. |
| 6,275,268 | B1 | 8/2001 | Ellis et al. | 6,642,939 | B1 | 11/2003 | Vallone et al. |
| 6,282,713 | B1 | 8/2001 | Kitsukawa et al. | 6,647,548 | B1 | 11/2003 | Lu et al. |
| 6,289,346 | B1 | 9/2001 | Milewski et al. | 6,651,044 | B1 | 11/2003 | Stoneman |
| 6,289,514 | B1 | 9/2001 | Link et al. | 6,662,365 | B1 | 12/2003 | Sullivan et al. |

| | | | | | | |
|---|---|---|---|---|---|---|
| 6,665,869 | B1 | 12/2003 | Ellis et al. | 7,512,964 B2 | 3/2009 | Rodriguez et al. |
| 6,671,328 | B1 | 12/2003 | Poon et al. | 7,526,788 B2 | 4/2009 | Rodriguez |
| 6,675,384 | B1 | 1/2004 | Block et al. | 7,647,549 B2 | 1/2010 | Denoual et al. |
| 6,675,385 | B1 | 1/2004 | Wang | 7,673,314 B2 | 3/2010 | Ellis et al. |
| 6,678,891 | B1 | 1/2004 | Wilcox et al. | 7,685,520 B2 | 3/2010 | Rashkovskiy et al. |
| 6,681,395 | B1 | 1/2004 | Nishi | 7,707,614 B2 | 4/2010 | Krikorian et al. |
| 6,681,396 | B1 | 1/2004 | Bates et al. | 7,934,232 B1 | 4/2011 | Jerding et al. |
| 6,684,025 | B1 | 1/2004 | Perlman | 7,961,643 B2 | 6/2011 | McDonald et al. |
| 6,684,400 | B1 | 1/2004 | Goode et al. | 7,962,370 B2 | 6/2011 | Rodriguez et al. |
| 6,697,376 | B1 | 2/2004 | Son et al. | 2001/0003846 A1 | 6/2001 | Rowe et al. |
| 6,698,023 | B2 | 2/2004 | Levitan | 2001/0013125 A1 | 8/2001 | Kitsukawa et al. |
| 6,701,523 | B1 | 3/2004 | Hancock et al. | 2001/0013127 A1 | 8/2001 | Tomita et al. |
| 6,701,528 | B1 | 3/2004 | Arsenault et al. | 2001/0029523 A1 | 10/2001 | Mcternan et al. |
| 6,706,311 | B2 | 3/2004 | Wong et al. | 2001/0030667 A1 | 10/2001 | Kelts |
| 6,708,336 | B1 | 3/2004 | Bruette | 2001/0032335 A1 | 10/2001 | Jones |
| 6,717,590 | B1 | 4/2004 | Sullivan et al. | 2001/0034763 A1 | 10/2001 | Jacobs et al. |
| 6,718,552 | B1 | 4/2004 | Goode | 2001/0036271 A1 | 11/2001 | Javed |
| 6,725,461 | B1 | 4/2004 | Dougherty et al. | 2001/0044744 A1 | 11/2001 | Rhoads |
| 6,731,310 | B2 | 5/2004 | Craycroft et al. | 2002/0002642 A1 | 1/2002 | Tyson et al. |
| 6,732,367 | B1 | 5/2004 | Ellis et al. | 2002/0007485 A1 | 1/2002 | Rodriguez et al. |
| 6,732,369 | B1 | 5/2004 | Leftwich et al. | 2002/0013836 A1 | 1/2002 | Friedman et al. |
| 6,732,372 | B2 | 5/2004 | Tomita et al. | 2002/0026496 A1 | 2/2002 | Boyer et al. |
| 6,735,572 | B2 | 5/2004 | Landesmann | 2002/0026638 A1 | 2/2002 | Eldering et al. |
| 6,738,982 | B1 | 5/2004 | Jerding | 2002/0032638 A1 | 3/2002 | Arora et al. |
| 6,757,909 | B1 | 6/2004 | Maruo et al. | 2002/0032728 A1 | 3/2002 | Sako et al. |
| 6,760,918 | B2 | 7/2004 | Rodriguez et al. | 2002/0032905 A1 | 3/2002 | Sherr et al. |
| 6,769,127 | B1 | 7/2004 | Bonomi et al. | 2002/0042913 A1 | 4/2002 | Ellis et al. |
| 6,771,290 | B1 | 8/2004 | Hoyle | 2002/0044762 A1 | 4/2002 | Wood et al. |
| 6,772,209 | B1 | 8/2004 | Chernock et al. | 2002/0049804 A1 | 4/2002 | Rodriguez et al. |
| 6,772,433 | B1 | 8/2004 | LaJoie et al. | 2002/0049978 A1 | 4/2002 | Rodriguez et al. |
| 6,782,550 | B1 | 8/2004 | Cao | 2002/0056098 A1 | 5/2002 | White |
| 6,791,620 | B1 | 9/2004 | Elswick et al. | 2002/0056118 A1 | 5/2002 | Hunter et al. |
| 6,792,615 | B1 | 9/2004 | Rowe et al. | 2002/0057336 A1 | 5/2002 | Gaul et al. |
| 6,801,533 | B1 | 10/2004 | Barkley | 2002/0062481 A1 | 5/2002 | Slaney et al. |
| 6,817,028 | B1 | 11/2004 | Jerding et al. | 2002/0069105 A1 | 6/2002 | do Rosario Botelho et al. |
| 6,832,386 | B1 | 12/2004 | Jerding et al. | 2002/0069218 A1 | 6/2002 | Sull et al. |
| 6,847,969 | B1 | 1/2005 | Mathai et al. | 2002/0069412 A1 | 6/2002 | Philips |
| 6,876,628 | B2 | 4/2005 | Howard et al. | 2002/0078176 A1 | 6/2002 | Nomura et al. |
| 6,898,762 | B2 | 5/2005 | Ellis et al. | 2002/0083443 A1 | 6/2002 | Eldering et al. |
| 6,901,385 | B2 | 5/2005 | Okamoto et al. | 2002/0087981 A1 | 7/2002 | Daniels |
| 6,957,386 | B2 | 10/2005 | Nishina et al. | 2002/0101367 A1 * | 8/2002 | Geiger et al. .................. 341/51 |
| 6,968,372 | B1 | 11/2005 | Thompson et al. | 2002/0104083 A1 | 8/2002 | Hendricks et al. |
| 6,978,310 | B1 | 12/2005 | Rodriguez et al. | 2002/0108125 A1 | 8/2002 | Joao |
| 6,978,475 | B1 | 12/2005 | Kunin et al. | 2002/0124249 A1 | 9/2002 | Shintani et al. |
| 6,986,156 | B1 | 1/2006 | Rodriguez et al. | 2002/0128908 A1 | 9/2002 | Levin et al. |
| 6,990,676 | B1 | 1/2006 | Proehl et al. | 2002/0129362 A1 | 9/2002 | Chang et al. |
| 6,990,677 | B1 | 1/2006 | Pietraszak et al. | 2003/0002862 A1 | 1/2003 | Rodriguez et al. |
| 6,993,782 | B1 | 1/2006 | Newberry et al. | 2003/0014753 A1 | 1/2003 | Beach et al. |
| 7,010,801 | B1 | 3/2006 | Jerding et al. | 2003/0030679 A1 | 2/2003 | Jain |
| 7,024,681 | B1 | 4/2006 | Fransman et al. | 2003/0031465 A1 | 2/2003 | Blake |
| 7,039,944 | B1 | 5/2006 | Cho et al. | 2003/0037068 A1 | 2/2003 | Thomas et al. |
| 7,062,466 | B2 | 6/2006 | Wagner et al. | 2003/0037332 A1 | 2/2003 | Chapin et al. |
| 7,076,734 | B2 | 7/2006 | Wolff et al. | 2003/0061619 A1 | 3/2003 | Giammaressi |
| 7,086,077 | B2 | 8/2006 | Giammaressi | 2003/0067554 A1 | 4/2003 | Klarfeld et al. |
| 7,103,903 | B1 | 9/2006 | Kydd | 2003/0074214 A1 | 4/2003 | Kelliher |
| 7,110,714 | B1 | 9/2006 | Kay et al. | 2003/0074257 A1 | 4/2003 | Saveliev et al. |
| 7,117,440 | B2 | 10/2006 | Gordon et al. | 2003/0079227 A1 | 4/2003 | Knowles et al. |
| 7,120,926 | B1 | 10/2006 | Safadi et al. | 2003/0088872 A1 | 5/2003 | Maissel et al. |
| 7,143,430 | B1 | 11/2006 | Fingerman et al. | 2003/0101451 A1 | 5/2003 | Bentolila et al. |
| 7,150,031 | B1 | 12/2006 | Rodriguez et al. | 2003/0101454 A1 | 5/2003 | Ozer et al. |
| 7,155,733 | B2 | 12/2006 | Rodriguez et al. | 2003/0124973 A1 | 7/2003 | Sie et al. |
| 7,180,422 | B2 * | 2/2007 | Milenkovic et al. ........ 340/572.4 | 2003/0126425 A1 | 7/2003 | Yang et al. |
| 7,185,355 | B1 | 2/2007 | Ellis et al. | 2003/0131356 A1 | 7/2003 | Proehl et al. |
| 7,188,356 | B1 | 3/2007 | Miura et al. | 2003/0135853 A1 | 7/2003 | Goldman et al. |
| 7,194,757 | B1 | 3/2007 | Fish et al. | 2003/0154475 A1 | 8/2003 | Rodriguez et al. |
| 7,200,857 | B1 | 4/2007 | Rodriguez et al. | 2003/0154486 A1 | 8/2003 | Dunn et al. |
| 7,237,251 | B1 | 6/2007 | Oz et al. | 2003/0159147 A1 | 8/2003 | Young et al. |
| 7,243,364 | B2 | 7/2007 | Dunn et al. | 2003/0174243 A1 | 9/2003 | Arbeiter |
| 7,249,366 | B1 | 7/2007 | Flavin | 2003/0188313 A1 | 10/2003 | Ellis et al. |
| 7,324,552 | B1 | 1/2008 | Galand et al. | 2003/0193486 A1 | 10/2003 | Estrop |
| 7,324,553 | B1 * | 1/2008 | Varier et al. ................. 370/468 | 2003/0206553 A1 | 11/2003 | Surcouf et al. |
| 7,334,251 | B2 | 2/2008 | Rodriguez et al. | 2003/0219228 A1 | 11/2003 | Thiagarajan |
| 7,340,759 | B1 | 3/2008 | Rodriguez | 2003/0221194 A1 | 11/2003 | Thiagarajan |
| 7,343,614 | B1 | 3/2008 | Hendricks et al. | 2004/0034867 A1 | 2/2004 | Rashkovskiy et al. |
| 7,356,477 | B1 | 4/2008 | Allan et al. | 2004/0049787 A1 | 3/2004 | Maissel et al. |
| 7,404,200 | B1 | 7/2008 | Hailey et al. | 2004/0107436 A1 | 6/2004 | Ishizaki |
| 7,496,943 | B1 | 2/2009 | Goldberg et al. | 2004/0117831 A1 | 6/2004 | Ellis et al. |
| 7,496,945 | B2 | 2/2009 | Rodriguez | 2004/0128685 A1 | 7/2004 | Hassell et al. |
| 7,509,267 | B1 | 3/2009 | Yarmolich et al. | 2004/0133907 A1 | 7/2004 | Rodriguez |

| | | |
|---|---|---|
| 2004/0163117 A1 | 8/2004 | Rodriguez et al. |
| 2004/0168191 A1 | 8/2004 | Jerding et al. |
| 2004/0181801 A1 | 9/2004 | Hagen et al. |
| 2004/0221310 A1 | 11/2004 | Herrington et al. |
| 2004/0261112 A1 | 12/2004 | Hicks et al. |
| 2004/0261125 A1 | 12/2004 | Ellis et al. |
| 2005/0008074 A1* | 1/2005 | van Beek et al. ........ 375/240.01 |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1* | 4/2005 | Amine et al. ............... 725/100 |
| 2005/0111046 A1* | 5/2005 | Kurumisawa et al. ....... 358/3.06 |
| 2005/0138657 A1 | 6/2005 | Leftwich |
| 2005/0155056 A1 | 7/2005 | Knee et al. |
| 2005/0160468 A1 | 7/2005 | Rodriguez |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1* | 4/2006 | Shen et al. ............... 375/240.21 |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1* | 6/2008 | Onur et al. ............... 375/240.26 |
| 2008/0155631 A1 | 6/2008 | Liwerant et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150958 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |

FOREIGN PATENT DOCUMENTS

| | | |
|---|---|---|
| CA | 2 223 025 C | 11/2001 |
| CA | 2 475 723 C | 1/2011 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A1 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1069801 | 1/2001 |
| EP | 1 075 143 A1 | 2/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| JP | 2000-101941 | 4/2000 |
| WO | WO 92/22983 | 12/1992 |
| WO | WO 94/14284 | 6/1994 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |
| WO | WO 99/52285 | 10/1999 |
| WO | WO 99/57903 | 11/1999 |
| WO | WO 99/60790 | 11/1999 |
| WO | WO 99/66719 | 12/1999 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |

| | | | |
|---|---|---|---|
| WO | WO 01/76245 A2 | 10/2001 | |
| WO | WO 01/77888 A2 | 10/2001 | |
| WO | WO 01/84831 A2 | 11/2001 | |
| WO | WO 02/097584 A | 12/2002 | |
| WO | WO 03/003164 A2 | 1/2003 | |
| WO | WO 03/003709 A2 | 1/2003 | |
| WO | WO 03/014873 A2 | 2/2003 | |
| WO | WO 03/024084 A2 | 3/2003 | |
| WO | WO 03/042787 A2 | 5/2003 | |
| WO | WO 03/069898 A1 | 8/2003 | |
| WO | WO 2004/091219 | 10/2004 | |
| WO | WO 2004/100500 A2 | 11/2004 | |
| WO | WO 2005/059202 A1 | 6/2005 | |
| WO | WO 2005/071658 A1 | 8/2005 | |
| WO | WO 2007/030370 A1 | 3/2007 | |

OTHER PUBLICATIONS

"Client User Interface Specification (Phase I) for Video-On-Demand Application Development on the Explorer 2000 ™ Digital Home Communications Terminal", Revision 1.10 (Aug. 31, 1998).

"Evidence of illustrative movie release years," Retrieved from the Internet Movie Database using Internet, http://www.imdb.com, 19 pages (Retrieved on Jun. 6, 2005).

"ISO/IEC 13818-6 Information technology—Generic coding of moving pictures and associated audio information—Part 6: Extensions for DSM-CCc," Chapter 4, 113 pages (Sep. 1, 1998).

"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).

"Netscape Navigator Help," Netscape Navigator Software User Documentation, Netscape Communications Corporation, http://home.netscape.com, XP-002166369, pp. 1-63 (Aug. 10, 1997).

"SezYou . . . origin of word daemon," *Take Our Word for It,* Issue 146, p. 4, http://www.takeourword.com/TOW146/page4.html (retrieved on Apr. 4, 2006).

Addington, Timothy H., "System Architecture Specification for Video-On-Demand Application Development on the Explorer 2000™ Digital Home Communications Terminal", Revision 1.10r Review Copy (Mar. 4, 1999).

Alberico, G. et al., "Satellite Interactive Multimedia: A New Opportunity for Broadcasters," *International Broadcasting Convention,* Conference Publication No. 447, pp. 18-23 (Sep. 12-16, 1997).

ATI Multimedia Center 7.9, User's Guide, ATI Technologies Inc., pp. i-vi and 1-96 (Copyright 2002).

Barth et al., "10 Fernsehen am PC", Suse GMBH, XP-002324319, pp. 143-149 (2001).

BPAI Decision for U.S. Appl. No. 09/692,995, mailed Aug. 20, 2008.

BPAI Decision for U.S. Appl. No. 09/693,288, mailed Nov. 28, 2007.

Canadian Office Action cited in Application No. 2,376,556 mailed Sep. 30, 2008.

Canadian Office Action cited in Application No. 2,376,556 mailed Nov. 23, 2007.

Canadian Office Action cited in Application No. 2,376,556 mailed Dec. 6, 2005.

Canadian Office Action cited in Application No. 2,402,088 mailed Jun. 1, 2010.

Canadian Office Action cited in Application No. 2,402,088 mailed May 30, 2006.

Canadian Office Action cited in Application No. 2,405,491 mailed Jun. 9, 2010.

Canadian Office Action cited in Application No. 2,405,491 mailed Apr. 3, 2009.

Canadian Office Action cited in Application No. 2,405,491 mailed May 22, 2008.

Canadian Office Action cited in Application No. 2,405,491 mailed Jun. 20, 2007.

Canadian Office Action cited in Application No. 2,405,491 mailed Jan. 20, 2006.

Canadian Office Action cited in Application No. 2,408,289 mailed Aug. 27, 2008.

Canadian Office Action cited in Application No. 2,408,289 mailed May 30, 2006.

Canadian Office Action cited in Application No. 2,451,477 mailed Nov. 3, 2009.

Canadian Office Action cited in Application No. 2,456,318 mailed May 5, 2008.

Canadian Office Action cited in Application No. 2,456,318 mailed Mar. 27, 2007.

Canadian Office Action cited in Application No. 2,459,334 mailed Apr. 16, 2009.

Canadian Office Action cited in Application No. 2,466,667 mailed Apr. 15, 2009.

Canadian Office Action cited in Application No. 2,475,723 mailed Jul. 7, 2009.

Canadian Office Action cited in Application No. 2,554,208 mailed Apr. 1, 2010.

Canadian Office Action cited in Application No. 2,621,605 mailed Dec. 15, 2009.

Cunningham et al., "5 Das X Window System"., Suse GMBH, XP-002324320, pp. 129-180 (2001).

Decision on Appeal affirmed cited in U.S. Appl. No. 09/590,434 mailed May 28, 2008.

Definition of "flag", *Microsoft Press: Computer User's Dictionary,* 3 pages (1998).

Definition of "renting", Webster's II: New College Dictionary, 1995, Houghton Mifflin Company, p. 939.

European Examination Report cited in Application No. 00 938 251.6 mailed Mar. 2, 2010.

European Examination Report cited in Application No. 00 938 251.6 mailed Nov. 2, 2007.

European Examination Report cited in Application No. 00 939 759.7 mailed May 10, 2007.

European Examination Report cited in Application No. 01 905 058.2 mailed Dec. 19, 2006.

European Examination Report cited in Application No. 01 922 261.1 mailed Jul. 18, 2008.

European Examination Report cited in Application No. 01 922 261.1 mailed Nov. 2, 2007.

European Examination Report cited in Application No. 01 922 261.1 mailed Jan. 24, 2007.

European Examination Report cited in Application No. 01 922 261.1 mailed May 26, 2006.

European Examination Report cited in Application No. 01 923 092.9 mailed Jul. 20, 2009.

European Examination Report cited in Application No. 01 923 092.9 mailed Nov. 27, 2008.

European Examination Report cited in Application No. 01 937 209.3 mailed Mar. 16, 2010.

European Examination Report cited in Application No. 01 937 209.3 mailed Jun. 23, 2008.

European Examination Report cited in Application No. 02 737 593.0 mailed May 6, 2009.

European Examination Report cited in Application No. 02 750 416.6 mailed Aug. 4, 2008.

European Examination Report cited in Application No. 02 750 416.6 mailed Aug. 28, 2007.

European Examination Report cited in Application No. 02 761 572.3 mailed Apr. 20, 2009.

European Examination Report cited in Application No. 02 761 572.3 mailed Sep. 22, 2008.

European Examination Report cited in Application No. 02 761 572.3 mailed Jan. 22, 2008.

European Examination Report cited in Application No. 02 761 572.3 mailed Aug. 29, 2007.

European Examination Report cited in Application No. 06 802 683.0 mailed Jun. 26, 2008.

Examiner's Answer to Appeal Brief cited in U.S. Appl. No. 09/590,488 mailed Jan. 11, 2008.

Japanese Office Action cited in Application No. 2001-581527 mailed Feb. 10, 2010.

Japanese Office Action cited in Application No. 2001-581527 mailed Sep. 8, 2009.

Kevin, "Change Screen Resolution in Windows (Tips, Tricks, Tweaks, and Setting)," http://www.tacktech.com/display.cfm?tid=207, pp. 1-3 (Oct. 26, 2002).

Leftwitch et al., "StarSight Interactive Television Program Guide—Functional/Interational Architecture Specification Document, Interaction Analysis and Design Project—Phase III," 36 pages.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
PCT Search Report cited in International Application No. PCT/US00/15952 mailed Jan. 16, 2001.
PCT Search Report cited in International Application No. PCT/US00/15963 mailed Sep. 1, 2000.
PCT Search Report cited in International Application No. PCT/US00/16000 mailed Oct. 2, 2000.
PCT Search Report cited in International Application No. PCT/US01/02490 mailed May 18, 2001.
PCT Search Report cited in International Application No. PCT/US01/06663 mailed Oct. 18, 2001.
PCT Search Report cited in International Application No. PCT/US01/10874 mailed Nov. 29, 2001.
PCT Search Report cited in International Application No. PCT/US01/14150 mailed Apr. 29, 2002.
PCT Search Report cited in International Application No. PCT/US02/20307 mailed Jan. 3, 2003.
PCT Search Report cited in International Application No. PCT/US02/20519 mailed Apr. 7, 2003.
PCT Search Report cited in International Application No. PCT/US02/24704 mailed Mar. 5, 2003.
PCT Search Report cited in International Application No. PCT/US02/28212 mailed Jan. 23, 2003.
PCT Search Report cited in International Application No. PCT/US02/36291 mailed May 23, 2003.
PCT Search Report cited in International Application No. PCT/US03/03391 mailed Jul. 14, 2003.
PCT Search Report and Written Opinion cited in International Application No. PCT/US2005/001812 mailed May 2, 2005.
PCT Search Report and Written Opinion cited in International Application No. PCT/US2006/033965 mailed Feb. 9, 2007.
PCT Search Report and Written Opinion cited in International Application No. PCT/US2006/033965 Feb. 19, 2007.
PCT Written Opinion cited in International Application No. PCT/US00/15952 mailed Jul. 25, 2001.
PCT Written Opinion cited in International Application No. PCT/US00/15963 mailed Jun. 22, 2001.
PCT Written Opinion cited in International Application No. PCT/US00/16000 mailed Oct. 25, 2001.
PCT Written Opinion cited in International Application No. PCT/US01/02490 mailed Oct. 23, 2001.
PCT Written Opinion cited in International Application No. PCT/US01/06663 mailed Jan. 3, 2002.
PCT Written Opinion cited in International Application No. PCT/US01/10874 mailed Jun. 4, 2002.
PCT Written Opinion cited in International Application No. PCT/US01/14150 mailed Sep. 30, 2004.
PCT Written Opinion cited in International Application No. PCT/US02/20307 mailed Aug. 8, 2003.
PCT Written Opinion cited in International Application No. PCT/US02/20519 mailed Apr. 6, 2004.
PCT Written Opinion cited in International Application No. PCT/US02/24704 mailed Nov. 20, 2003.
PCT Written Opinion cited in International Application No. PCT/US02/28212 mailed Dec. 4, 2003.
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Reid, Dixie, "Coming attractions before they hit the big screen, most films begin life as a trailer," The Sacramento Bee, Sacramento, California, p. E.1 (Jul. 18, 1996).
Remote Wonder, ATI, Tweak 3D, pp. 1-5 (Sep. 30, 2002).
Reply Brief in U.S. Appl. No. 09/565,931 mailed on Sep. 17, 2007.
Rottentomatoes web archived site, http://web.archive.org/web/20000301122211/http://rottentomatoes.com, Mar. 1, 2000, pp. 1-2.
Summons to attend oral proceedings pursuant to Rule 115(1) EPC in European Application No. 02737593.0-1241 mailed May 28, 2010.
Supplementary European Search Report cited in European Application No. 02737593.0 mailed Mar. 3, 2009.
Supplementary European Search Report cited in European Application No. 02744705.1 mailed Feb. 19, 2010.
Supplementary European Search Report cited in European Application No. 02750416.6 mailed Jan. 2, 2007.
Supplementary European Search Report cited in European Application No. 02761572.3 mailed Mar. 20, 2007.
Supplementary European Search Report cited in European Application No. 02797096.1 mailed Oct. 14, 2005.
Supplementary European Search Report cited in European Application No. 03713364.2 mailed Jul. 6, 2005.
U.S. Final Office Action cited in U.S. Appl. No. 09/518,041 mailed Jul. 7, 2008.
U.S. Non-Final Office Action cited in U.S. Appl. No. 09/518,041 mailed Jan. 10, 2008.
U.S. Final Office Action cited in U.S. Appl. No. 09/518,041 mailed Aug. 24, 2007.
U.S. Non-Final Office Action cited in U.S. Appl. No. 09/518,041 mailed Feb. 6, 2007.
U.S. Final Office Action cited in U.S. Appl. No. 09/518,041 mailed Aug. 28, 2006.
U.S. Non-Final Office Action cited in U.S. Appl. No. 09/518,041 mailed Apr. 4, 2006.
U.S. Final Office Action cited in U.S. Appl. No. 09/518,041 mailed Sep. 15, 2005.
U.S. Non-Final Office Action cited in U.S. Appl. No. 09/518,041 mailed Apr. 22, 2005.
U.S. Final Office Action cited in U.S. Appl. No. 09/518,041 mailed Oct. 20, 2004.
U.S. Non-Final Office Action cited in U.S. Appl. No. 09/518,041 mailed Feb. 11, 2004.
U.S. Final Office Action cited in U.S. Appl. No. 09/518,041 mailed Aug. 27, 2003.
U.S. Non-Final Office Action cited in U.S. Appl. No. 09/518,041 mailed Mar. 18, 2003.
U.S. Final Office Action cited in U.S. Appl. No. 09/542,484 mailed Jun. 17, 2008.
U.S. Non-Final Office Action cited in U.S. Appl. No. 09/542,484 mailed Dec. 7, 2007.
U.S. Non-Final Office Action cited in U.S. Appl. No. 09/542,484 mailed Mar. 12, 2007.
U.S. Non-Final Office Action cited in U.S. Appl. No. 09/542,484 mailed Sep. 7, 2006.
U.S. Final Office Action cited in U.S. Appl. No. 09/542,484 mailed Mar. 21, 2006.
U.S. Non-Final Office Action cited in U.S. Appl. No. 09/542,484 mailed Jul. 28, 2005.
U.S. Final Office Action cited in U.S. Appl. No. 09/542,484 mailed Mar. 22, 2005.
U.S. Non-Final Office Action cited in U.S. Appl. No. 09/542,484 mailed Apr. 1, 2004.
U.S. Non-Final Office Action cited in U.S. Appl. No. 09/565,931 mailed Oct. 28, 2009.
U.S. Final Office Action cited in U.S. Appl. No. 09/565,931 mailed Jul. 14, 2009.
U.S. Non-Final Office Action cited in U.S. Appl. No. 09/565,931 mailed Feb. 13, 2009.
U.S. Final Office Action cited in U.S. Appl. No. 09/565,931 mailed Jun. 15, 2006.
U.S. Non-Final Office Action cited in U.S. Appl. No. 09/565,931 mailed Jan. 11, 2006.
U.S. Final Office Action cited in U.S. Appl. No. 09/565,931 mailed Jul. 1, 2005.
U.S. Non-Final Office Action cited in U.S. Appl. No. 09/565,931 mailed Sep. 10, 2004.
U.S. Final Office Action cited in U.S. Appl. No. 09/590,434 mailed May 11, 2006.

U.S. Non-Final Office Action cited in U.S. Appl. No. 09/590,434 mailed Nov. 21, 2005.
U.S. Final Office Action cited in U.S. Appl. No. 09/590,434 mailed Dec. 1, 2004.
U.S. Non-Final Office Action cited in U.S. Appl. No. 09/590,434 mailed Apr. 22, 2004.
U.S. Final Office Action cited in U.S. Appl. No. 09/590,434 mailed Dec. 18, 2003.
U.S. Non-Final Office Action cited in U.S. Appl. No. 09/590,434 mailed May 23, 2003.
U.S. Final Office Action cited in U.S. Appl. No. 09/590,488 mailed Feb. 27, 2007.
U.S. Non-Final Office Action cited in U.S. Appl. No. 09/590,488 mailed Oct. 26, 2006.
U.S. Final Office Action cited in U.S. Appl. No. 09/590,488 mailed Jul. 10, 2006.
U.S. Non-Final Office Action cited in U.S. Appl. No. 09/590,488 mailed Dec. 20, 2005.
U.S. Final Office Action cited in U.S. Appl. No. 09/590,488 mailed Jun. 30, 2005.
U.S. Non-Final Office Action cited in U.S. Appl. No. 09/590,488 mailed Nov. 16, 2004.
U.S. Final Office Action cited in U.S. Appl. No. 09/590,488 mailed Jun. 7, 2004.
U.S. Final Office Action cited in U.S. Appl. No. 09/590,488 mailed Dec. 16, 2003.
U.S. Non-Final Office Action cited in U.S. Appl. No. 09/590,488 mailed Jun. 10, 2003.
U.S. Final Office Action cited in U.S. Appl. No. 09/590,904 mailed Sep. 13, 2007.
U.S. Non-Final Office Action cited in U.S. Appl. No. 09/590,904 mailed Mar. 26, 2007.
U.S. Final Office Action cited in U.S. Appl. No. 09/590,904 mailed Nov. 15, 2006.
U.S. Non-Final Office Action cited in U.S. Appl. No. 09/590,904 mailed May 31, 2006.
U.S. Final Office Action cited in U.S. Appl. No. 09/590,904 mailed Jan. 24, 2006.
U.S. Non-Final Office Action cited in U.S. Appl. No. 09/590,904 mailed Jul. 13, 2005.
U.S. Final Office Action cited in U.S. Appl. No. 09/590,904 mailed Jan. 11, 2005.
U.S. Non-Final Office Action cited in U.S. Appl. No. 09/590,904 mailed Jun. 4, 2004.
U.S. Final Office Action cited in U.S. Appl. No. 09/591,356 mailed Apr. 13, 2006.
U.S. Non-Final Office Action cited in U.S. Appl. No. 09/591,356 mailed Dec. 20, 2005.
U.S. Final Office Action cited in U.S. Appl. No. 09/591,356 mailed Jun. 30, 2005.
U.S. Final Office Action cited in U.S. Appl. No. 09/591,356 mailed May 10, 2004.
U.S. Non-Final Office Action cited in U.S. Appl. No. 09/591,356 mailed Jan. 14, 2004.
U.S. Final Office Action cited in U.S. Appl. No. 09/591,356 mailed Sep. 26, 2003.
U.S. Non-Final Office Action cited in U.S. Appl. No. 09/591,356 mailed May 21, 2003.
U.S. Final Office Action cited in U.S. Appl. No. 09/692,920 mailed Jul. 22, 2008.
U.S. Non-Final Office Action cited in U.S. Appl. No. 09/692,920 mailed Jan. 17, 2008.
U.S. Final Office Action cited in U.S. Appl. No. 09/692,920 mailed Jun. 14, 2007.
U.S. Non-Final Office Action cited in U.S. Appl. No. 09/692,920 mailed Nov. 24, 2006.
U.S. Final Office Action cited in U.S. Appl. No. 09/692,920 mailed Jun. 21, 2006.
U.S. Non-Final Office Action cited in U.S. Appl. No. 09/692,920 mailed Feb. 16, 2006.
U.S. Final Office Action cited in U.S. Appl. No. 09/692,920 mailed Jun. 17, 2005.
U.S. Non-Final Office Action cited in U.S. Appl. No. 09/692,920 mailed Nov. 18, 2004.
U.S. Final Office Action cited in U.S. Appl. No. 09/692,995 mailed Sep. 4, 2009.
U.S. Non-Final Office Action cited in U.S. Appl. No. 09/692,995 mailed Jan. 23, 2009.
U.S. Final Office Action cited in U.S. Appl. No. 09/692,995 mailed Sep. 8, 2006.
U.S. Non-Final Office Action cited in U.S. Appl. No. 09/692,995 mailed Mar. 27, 2006.
U.S. Final Office Action cited in U.S. Appl. No. 09/692,995 mailed Sep. 21, 2005.
U.S. Final Office Action cited in U.S. Appl. No. 09/692,995 mailed May 3, 2005.
U.S. Non-Final Office Action cited in U.S. Appl. No. 09/692,995 mailed Oct. 21, 2004.
U.S. Final Office Action cited in U.S. Appl. No. 09/692,995 mailed Apr. 26, 2004.
U.S. Non-Final Office Action cited in U.S. Appl. No. 09/692,995 mailed Dec. 5, 2003.
U.S. Final Office Action cited in U.S. Appl. No. 09/693,115 mailed Jan. 25, 2005.
U.S. Non-Final Office Action cited in U.S. Appl. No. 09/693,115 mailed Jun. 16, 2004.
U.S. Final Office Action cited in U.S. Appl. No. 09/693,115 mailed Feb. 9, 2004.
U.S. Non-Final Office Action cited in U.S. Appl. No. 09/693,115 mailed Sep. 26, 2003.
U.S. Non-Final Office Action cited in U.S. Appl. No. 09/693,288 mailed Jun. 21, 2010.
U.S. Final Office Action cited in U.S. Appl. No. 09/693,288 mailed Dec. 1, 2005.
U.S. Non-Final Office Action cited in U.S. Appl. No. 09/693,288 mailed Jul. 19, 2005.
U.S. Final Office Action cited in U.S. Appl. No. 09/693,288 mailed Feb. 10, 2005.
U.S. Non-Final Office Action cited in U.S. Appl. No. 09/693,288 mailed Jul. 15, 2004.
U.S. Final Office Action cited in U.S. Appl. No. 09/693,288 mailed Feb. 26, 2004.
U.S. Non-Final Office Action cited in U.S. Appl. No. 09/693,288 mailed Oct. 27, 2003.
U.S. Final Office Action cited in U.S. Appl. No. 09/693,790 mailed Jul. 25, 2008.
U.S. Non-Final Office Action cited in U.S. Appl. No. 09/693,790 mailed Jan. 15, 2008.
U.S. Final Office Action cited in U.S. Appl. No. 09/693,790 mailed Jun. 19, 2007.
U.S. Non-Final Office Action cited in U.S. Appl. No. 09/693,790 mailed Dec. 28, 2006.
U.S. Final Office Action cited in U.S. Appl. No. 09/693,790 mailed Jun. 16, 2006.
U.S. Non-Final Office Action cited in U.S. Appl. No. 09/693,790 mailed Dec. 28, 2005.
U.S. Final Office Action cited in U.S. Appl. No. 09/693,790 mailed Jun. 21, 2005.
U.S. Non-Final Office Action cited in U.S. Appl. No. 09/693,790 mailed Oct. 6, 2004.
U.S. Final Office Action cited in U.S. Appl. No. 09/881,516 mailed Jun. 3, 2005.
U.S. Non-Final Office Action cited in U.S. Appl. No. 09/881,516 mailed Dec. 29, 2004.
U.S. Final Office Action cited in U.S. Appl. No. 09/881,516 mailed Jul. 26, 2004.
U.S. Final Office Action cited in U.S. Appl. No. 09/881,516 mailed Apr. 21, 2004.
U.S. Non-Final Office Action cited in U.S. Appl. No. 09/881,516 mailed Oct. 28, 2003.
U.S. Final Office Action cited in U.S. Appl. No. 09/894,508 mailed Sep. 17, 2009.
U.S. Non-Final Office Action cited in U.S. Appl. No. 09/894,508 mailed Feb. 4, 2009.

U.S. Non-Final Office Action cited in U.S. Appl. No. 09/894,508 mailed Jun. 13, 2008.
U.S. Final Office Action cited in U.S. Appl. No. 09/894,508 mailed Dec. 31, 2007.
U.S. Non-Final Office Action cited in U.S. Appl. No. 09/894,508 mailed Jul. 26, 2007.
U.S. Final Office Action cited in U.S. Appl. No. 09/896,231 mailed May 28, 2010.
U.S. Non-Final Office Action cited in U.S. Appl. No. 09/896,231 mailed Nov. 17, 2009.
U.S. Final Office Action cited in U.S. Appl. No. 09/896,231 mailed Jun. 3, 2009.
U.S. Non-Final Office Action cited in U.S. Appl. No. 09/896,231 mailed Dec. 23, 2008.
U.S. Final Office Action cited in U.S. Appl. No. 09/896,231 mailed Dec. 29, 2005.
U.S. Non-Final Office Action cited in U.S. Appl. No. 09/896,231 mailed Jun. 23, 2005.
U.S. Final Office Action cited in U.S. Appl. No. 09/924,111 mailed Aug. 7, 2008.
U.S. Non-Final Office Action cited in U.S. Appl. No. 09/924,111 mailed Jan. 29, 2008.
U.S. Final Office Action cited in U.S. Appl. No. 09/924,111 mailed Oct. 5, 2007.
U.S. Non-Final Office Action cited in U.S. Appl. No. 09/924,111 mailed Apr. 19, 2007.
U.S. Final Office Action cited in U.S. Appl. No. 09/924,111 mailed Sep. 18, 2006.
U.S. Non-Final Office Action cited in U.S. Appl. No. 09/924,111 mailed Mar. 15, 2006.
U.S. Final Office Action cited in U.S. Appl. No. 09/947,890 mailed Nov. 24, 2009.
U.S. Non-Final Office Action cited in U.S. Appl. No. 09/947,890 mailed Apr. 10, 2009.
U.S. Final Office Action cited in U.S. Appl. No. 09/947,890 mailed Nov. 6, 2008.
U.S. Non-Final Office Action cited in U.S. Appl. No. 09/947,890 mailed Jun. 25, 2008.
U.S. Final Office Action cited in U.S. Appl. No. 10/740,138 mailed Jan. 15, 2010.
U.S. Non-Final Office Action cited in U.S. Appl. No. 10/740,138 mailed Sep. 3, 2009.
U.S. Final Office Action cited in U.S. Appl. No. 10/740,138 mailed Mar. 19, 2009.
U.S. Non-Final Office Action cited in U.S. Appl. No. 10/740,138 mailed Sep. 15, 2008.
U.S. Final Office Action cited in U.S. Appl. No. 10/740,138 mailed Jun. 11, 2008.
U.S. Non-Final Office Action cited in U.S. Appl. No. 10/740,138 mailed Oct. 2, 2007.
U.S. Final Office Action cited in U.S. Appl. No. 10/761,777 mailed Aug. 2, 2010.
U.S. Non-final Office Action cited in U.S. Appl. No. 10/761,777 mailed Jan. 21, 2010.
U.S. Non-Final Office Action cited in U.S. Appl. No. 10/761,777 mailed Jun. 11, 2009.
U.S. Final Office Action cited in U.S. Appl. No. 10/761,777 mailed Dec. 19, 2008.
U.S. Non-Final Office Action cited in U.S. Appl. No. 10/761,777 mailed Jul. 18, 2007.
U.S. Non-Final Office Action cited in U.S. Appl. No. 10/761,777 mailed Jan. 24, 2007.
U.S. Final Office Action cited in U.S. Appl. No. 10/778,494 mailed Jul. 25, 2008.
U.S. Non-Final Office Action cited in U.S. Appl. No. 10/778,494 mailed Jan. 16, 2008.
U.S. Final Office Action cited in U.S. Appl. No. 10/778,494 mailed May 22, 2007.
U.S. Non-Final Office Action cited in U.S. Appl. No. 10/778,494 mailed Feb. 2, 2007.
U.S. Final Office Action cited in U.S. Appl. No. 10/778,494 mailed Aug. 28, 2006.
U.S. Non-Final Office Action cited in U.S. Appl. No. 10/778,494 mailed Dec. 29, 2004.
U.S. Final Office Action cited in U.S. Appl. No. 10/783,235 mailed Oct. 2, 2008.
U.S. Non-Final Office Action cited in U.S. Appl. No. 10/783,235 mailed Feb. 25, 2008.
U.S. Non-Final Office Action cited in U.S. Appl. No. 10/934,253 mailed Apr. 27, 2010.
U.S. Final Office Action cited in U.S. Appl. No. 10/934,253 mailed Dec. 23, 2009.
U.S. Non-Final Office Action cited in U.S. Appl. No. 10/934,253 mailed Jun. 26, 2009.
U.S. Final Office Action cited in U.S. Appl. No. 10/934,253 mailed Dec. 26, 2008.
U.S. Non-Final Office Action cited in U.S. Appl. No. 10/934,253 mailed Jun. 17, 2008.
U.S. Final Office Action cited in U.S. Appl. No. 10/934,253 mailed Jul. 24, 2007.
U.S. Non-Final Office Action cited in U.S. Appl. No. 10/934,253 mailed Feb. 9, 2007.
U.S. Non-Final Office Action cited in U.S. Appl. No. 10/934,253 mailed Sep. 14, 2006.
U.S. Final Office Action cited in U.S. Appl. No. 10/957,849 mailed Aug. 8, 2008.
U.S. Non-Final Office Action cited in U.S. Appl. No. 10/957,849 mailed Apr. 30, 2008.
U.S. Final Office Action cited in U.S. Appl. No. 10/957,854 mailed Apr. 1, 2010.
U.S. Non-Final Office Action cited in U.S. Appl. No. 10/957,854 mailed Sep. 28, 2009.
U.S. Final Office Action cited in U.S. Appl. No. 10/957,854 mailed Apr. 7, 2009.
U.S. Non-Final Office Action cited in U.S. Appl. No. 10/957,854 mailed Oct. 15, 2008.
U.S. Non-Final Office Action cited in U.S. Appl. No. 10/957,854 mailed Apr. 30, 2008.
U.S. Non-Final Office Action cited in U.S. Appl. No. 10/957,942 mailed Jun. 30, 2010.
U.S. Final Office Action cited in U.S. Appl. No. 10/957,942 mailed Jul. 28, 2009.
U.S. Non-Final Office Action cited in U.S. Appl. No. 10/957,942 mailed Jan. 14, 2009.
U.S. Final Office Action cited in U.S. Appl. No. 10/957,942 mailed Jul. 31, 2008.
U.S. Non-Final Office Action cited in U.S. Appl. No. 10/957,942 mailed May 1, 2008.
U.S. Final Office Action cited in U.S. Appl. No. 10/981,053 mailed Jan. 21, 2010.
U.S. Non-Final Office Action cited in U.S. Appl. No. 10/981,053 mailed Apr. 15, 2009.
U.S. Final Office Action cited in U.S. Appl. No. 10/981,053 mailed Aug. 6, 2008.
U.S. Non-Final Office Action cited in U.S. Appl. No. 10/891,053 mailed Jan. 2, 2008.
U.S. Final Office Action cited in U.S. Appl. No. 10/994,599 mailed Dec. 1, 2006.
U.S. Non-Final Office Action cited in U.S. Appl. No. 10/994,599 mailed May 16, 2006.
U.S. Final Office Action cited in U.S. Appl. No. 10/994,599 mailed Jan. 26, 2006.
U.S. Non-Final Office Action cited in U.S. Appl. No. 10/994,599 mailed Aug. 23, 2005.
U.S. Final Office Action cited in U.S. Appl. No. 11/170,348 mailed Feb. 1, 2010.
U.S. Non-Final Office Action cited in U.S. Appl. No. 11/170,348 mailed Sep. 30, 2009.
U.S. Final Office Action cited in U.S. Appl. No. 11/170,348 mailed May 28, 2009.
U.S. Non-Final Office Action cited in U.S. Appl. No. 11/170,348 mailed Dec. 11, 2008.
U.S. Final Office Action cited in U.S. Appl. No. 11/208,387 mailed Dec. 22, 2008.

U.S. Non-Final Office Action cited in U.S. Appl. No. 11/208,387 mailed Jun. 12, 2008.
U.S. Non-Final Office Action cited in U.S. Appl. No. 11/238,369 mailed Mar. 30, 2010.
U.S. Non-Final Office Action cited in U.S. Appl. No. 11/244,621 mailed Feb. 5, 2010.
U.S. Final Office Action cited in U.S. Appl. No. 11/244,621 mailed Sep. 17, 2009.
U.S. Non-Final Office Action cited in U.S. Appl. No. 11/244,621 mailed Mar. 19, 2009.
U.S. Non-Final Office Action cited in U.S. Appl. No. 11/244,621 mailed Sep. 19, 2008.
U.S. Non-Final Office Action cited in U.S. Appl. No. 11/275,245 mailed May 5, 2010.
U.S. Non-Final Office Action cited in U.S. Appl. No. 11/275,245 mailed Oct. 22, 2009.
U.S. Final Office Action cited in U.S. Appl. No. 11/275,245 mailed Jul. 29, 2009.
U.S. Non-Final Office Action cited in U.S. Appl. No. 11/275,245 mailed Sep. 22, 2008.
U.S. Final Office Action cited in U.S. Appl. No. 11/460,516 mailed Mar. 18, 2010.
U.S. Non-Final Office Action cited in U.S. Appl. No. 11/460,516 mailed Jun. 26, 2009.
U.S. Final Office Action cited in U.S. Appl. No. 11/460,516 mailed Feb. 13, 2009.
U.S. Non-Final Office Action cited in U.S. Appl. No. 11/460,516 mailed Sep. 17, 2008.
U.S. Final Office Action cited in U.S. Appl. No. 11/496,303 mailed Jul. 22, 2010.
U.S. Non-Final Office Action cited in U.S. Appl. No. 11/496,303 mailed Mar. 2, 2010.
U.S. Non-Final Office Action cited in U.S. Appl. No. 11/496,303 mailed Sep. 29, 2009.
U.S. Final Office Action cited in U.S. Appl. No. 11/496,303 mailed Apr. 1, 2009.
U.S. Non-Final Office Action cited in U.S. Appl. No. 11/496,303 mailed Sep. 18, 2008.
U.S. Non-Final Office Action cited in U.S. Appl. No. 11/564,431 mailed Jul. 20, 2010.
U.S. Final Office Action cited in U.S. Appl. No. 11/564,431 mailed Jan. 4, 2010.
U.S. Non-Final Office Action cited in U.S. Appl. No. 11/564,431 mailed Aug. 24, 2009.
U.S. Final Office Action cited in U.S. Appl. No. 11/678,653 mailed Jun. 23, 2010.
U.S. Non-Final Office Action cited in U.S. Appl. No. 11/678,653 mailed Dec. 16, 2009.
U.S. Non-Final Office Action cited in U.S. Appl. No. 11/963,942 mailed Jun. 8, 2010.
U.S. Non-Final Office Action cited in U.S. Appl. No. 11/963,945 mailed Jul. 16, 2010.
U.S. Non-Final Office Action cited in U.S. Appl. No. 11/963,951 mailed Aug. 2, 2010.
U.S. Non-Final Office Action cited in U.S. Appl. No. 12/127,968 mailed Mar. 31, 2010.
U.S. Final Office Action cited in U.S. Appl. No. 12/127,968 mailed Dec. 1, 2009.
U.S. Non-Final Office Action cited in U.S. Appl. No. 12/127,968 mailed Apr. 30, 2009.
U.S. Non-Final Office Action cited in U.S. Appl. No. 12/179,752 mailed Dec. 23, 2009.
U.S. Non-Final Office Action cited in U.S. Appl. No. 12/179,767 mailed Jan. 22, 2010.
U.S. Non-Final Office Action cited in U.S. Appl. No. 12/180,416 mailed Jun. 25, 2010.
U.S. Final Office Action cited in U.S. Appl. No. 12/372,887 mailed Apr. 14, 2010.
U.S. Non-Final Office Action cited in U.S. Appl. No. 12/372,887 mailed Oct. 16, 2009.
U.S. Non-Final Office Action cited in U.S. Appl. No. 12/372,894 mailed Oct. 27, 2009.
U.S. Final Office Action cited in U.S. Appl. No. 12/372,917 mailed May 17, 2010.
U.S. Non-Final Office Action cited in U.S. Appl. No. 12/372,917 mailed Oct. 26, 2009.
U.S. Final Office Action cited in U.S. Appl. No. 12/388,139 mailed Jul. 6, 2010.
U.S. Non-Final Office Action cited in U.S. Appl. No. 12/388,139 mailed Dec. 15, 2009.
U.S. Non-Final Office Action cited in U.S. Appl. No. 12/389,128 mailed Jun. 2, 2010.
U.S. Final Office Action cited in U.S. Appl. No. 12/389,564 mailed Apr. 28, 2010.
U.S. Non-Final Office Action cited in U.S. Appl. No. 12/389,564 mailed Nov. 10, 2009.
U.S. Final Office Action cited in U.S. Appl. No. 12/413,686 mailed Jun. 10, 2010.
U.S. Non-Final Office Action cited in U.S. Appl. No. 12/413,686 mailed Nov. 30, 2009.
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931, filed May 4, 2000 entitled "Navigation Paradigm for Access to Television Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
U.S. Non-Final Office Action cited in U.S. Appl. No. 11/234,967 mailed Sep. 10, 2010.
U.S. Final Office Action cited in U.S. Appl. No. 11/238,369 mailed Aug. 31, 2010.
U.S. Final Office Action cited in U.S. Appl. No. 11/244,621 mailed Aug. 18, 2010.
U.S. Final Office Action cited in U.S. Appl. No. 12/127,968 mailed Sep. 14, 2010.
U.S. Final Office Action cited in U.S. Appl. No. 12/179,767 mailed Aug. 20, 2010.
U.S. Non-Final Office Action cited in U.S. Appl. No. 12/388,002 mailed Sep. 3, 2010.
U.S. Non-Final Office Action cited in U.S. Appl. No. 12/389,564 mailed Aug. 23, 2010.
Canadian Office Action cited in Application No. 2,408,289 mailed Sep. 2, 2010.

Canadian Office Action cited in Application No. 2,451,477 mailed Oct. 20, 2010.
U.S. Non-Final Office Action cited in U.S. Appl. No. 10/740,138 mailed Oct. 27, 2010.
U.S. Non-Final Office Action cited in U.S. Appl. No. 11/170,348 mailed Oct. 26, 2010.
U.S. Non-Final Office Action cited in U.S. Appl. No. 12/390,418 mailed Sep. 28, 2010.
U.S. Non-Final Office Action cited in U.S. Appl. No. 12/390,420 mailed Oct. 19, 2010.
U.S. Non-Final Office Action cited in U.S. Appl. No. 12/390,422 mailed Oct. 20, 2010.
U.S. Non-Final Office Action cited in U.S. Appl. No. 10/934,253 mailed Nov. 4, 2010.
Canadian Office Action cited in Application No. 2,456,318 mailed Nov. 17, 2010, 4 pages.
U.S. Non-Final Office Action cited in U.S. Appl. No. 12/179,763 mailed Jan. 4, 2011, 18 pages.
U.S. Final Office Action cited in U.S. Appl. No. 12/389,128 mailed Nov. 9, 2010, 50 pages.
U.S. Non-Final Office Action cited in U.S. Appl. No. 12/389,564 mailed Jan. 21, 2011, 13 pages.
"Industry Leading Software Vendors Endorse BroadVision's Next Generation of Retail and Business-To-Business E-Commerce Application Solutions," PR Newswire, Jun. 14, 1999, 4 pages.
U.S. Final Office Action cited in U.S. Appl. No. 09/693,288 mailed Feb. 8, 2011, 28 pages.
U.S. Non-Final Office Action cited in U.S. Appl. No. 12/413,686 mailed Mar. 17, 2011, 20 pages.
Canadian Office Action cited in Application No. 2,459,334 mailed Mar. 4, 2011, 3 pages.
Summons to attend oral proceedings in EP Application No. 01937209.3 mailed Mar. 21, 2011, 7 pages.
U.S. Non-Final Office Action cited in U.S. Appl. No. 10/761,777 mailed Apr. 12, 2011, 20 pages.
Canadian Office Action dated May 31, 2011 cited in Application No. 2,621,605, 2 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.

* cited by examiner

Manage/Optimize B/W per Client

| | |
|---|---|
| Stream 1 | 1.75 |
| Stream 2 | 2.50 |
| Stream 3 | Opportunistic |
| Stream 4 | 8.00 |
| Stream 5 | 7.00 |
| Stream 6 | Inactive |
| Stream 7 | <u>Inactive</u> |
| Total Cap | 20.50-Mbps. |

Fig. 5

OPTIMIZING BANDWIDTH UTILIZATION TO A SUBSCRIBER PREMISES

TECHNICAL FIELD

The present invention relates to IP television and bandwidth management. More particularly, the present invention relates to individualizing the video data rate for a particular television.

BACKGROUND OF THE INVENTION

The advent of higher-bandwidth Internet services over existing communication networks has created an alternative method to deliver video programming. However, Internet Protocol, or IP, based digital video distribution is capable of utilizing network infrastructures other than those used by the traditional Internet services. IP video or IP television (IPTV) is the transmission of television signals (digital video and audio) through data networks such as, for example, DSL, cable modem or wireless broadband.

Delivering video over IP is bandwidth intensive and, therefore, bandwidth to the home is a precious commodity due to the fact that broadband-quality video consumes a significant portion of a communication channel's data transmission capacity. IPTV services may be on a subscription basis paid for by the recipient for access to the network and requires an IP set-top box and an associated display device or TV within a subscriber premises, rather than a conventional cable television (CATV) set-top box. In order to retain customers, network access providers such as telephone companies may wish to provide IPTV over their existing infrastructure. This requires that they evolve their network.

When accessing a network such as the Internet, for example, a subscriber might connect through a high speed connection, such as Digital Subscriber Link, or DSL, that uses the same pair of copper wires as a regular telephone line. The pair of copper wires is capable of carrying a much greater bandwidth than what is typically demanded for voice. To use DSL, there is a DSL modem or transceiver at the subscriber's location. There is also a DSL Access Multiplexer (DSLAM) to receive subscriber connections at the location of the DSL service provider such as an Internet service provider or a telephone company. The DSLAM aggregates the subscriber connections onto a single high-capacity connection to the Internet. One way for a telephone company to provide DSL service is to have a DSLAM at its central office.

Also, many network operators oversubscribe the bandwidth on their network to maximize the return on investment in their network infrastructure. Oversubscribing bandwidth means the bandwidth a user subscribes to is not always available to them. Subscribers compete for available bandwidth and they receive more or less bandwidth depending on the amount of traffic from other subscribers on the network at any given time. When a network becomes increasingly congested, packets are dropped. Therefore, audio and video becomes corrupt due to packets being dropped when a link to a subscriber is oversubscribed.

Because there is never enough bandwidth, the traditional solution of the DSL service providers is to increase transmission line throughput, such as with equipment of significant cost, or reduce the bit-rate per channel for better encoding. However, services delivered to the home must be perceived to be of high quality and, thus, bit-rate reduction may not always be a suitable alternative. Therefore, in order to improve their video system, there is a need to intelligently manage and optimize the data rate for video services across a broadband connection such as DSL. In particular, individualized link bandwidth allocation is needed to manage and optimize bandwidth.

BRIEF DESCRIPTION OF THE DRAWINGS

FIG. 5 illustrates one embodiment of managed resources to a client according to one embodiment of the present invention.

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Throughout this specification, the transmission of a television signal, television program, or video program (e.g., a movie), are used interchangeably and refers to the transmission of a corresponding set of one or more streams that make up the television program or movie, such as a compressed digital video stream, a compressed digital audio stream, associated data streams, and/or an associated media stream.

Throughout this specification, the amount of bandwidth consumption refers to the amount of consumption in a transmission channel's capacity. Data rate and bit-rate have analogous meaning and refer to the amount of channel capacity consumption or bandwidth consumption.

Figure 1:
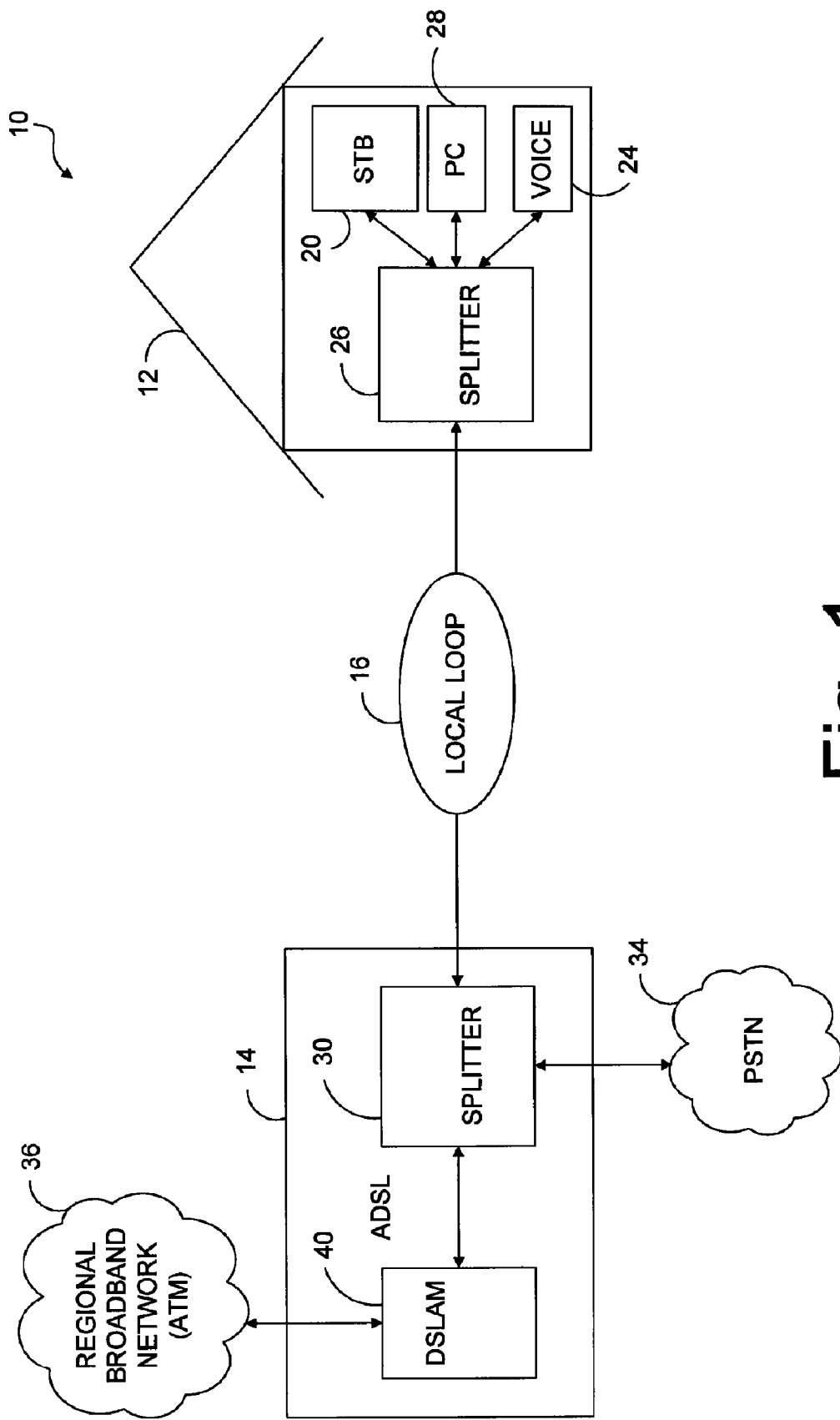
FIG. 1 illustrates one embodiment of an xDSL communications network having a plurality of subscriber premises in communications with a central office over a local loop.

FIG. 1 illustrates a broadband communications network 10, such as an xDSL communication network, having at least one subscriber premises 12 which communicates with a central office 14 through a local loop 16. Other types of broadband networks which support IP-based digital distribution such as fiber-to-the-home (FTTH) are within the scope of the present invention. The communications network 10 can provide xDSL communications in the xDSL band frequency while conventional communications take place over the voice band frequency.

The local loop 16 includes the communication network of the plain old telephone system (POTS). The subscriber premise 12 includes at least one or more home communications terminals with IP/xDSL capability that may be commonly referred to as an entertainment server or a set-top box (STB) 20. FIG. 1 depicts only one subscriber premises 12 having only one STB 20 as a matter of convenience. Each STB 20 in each subscriber premises may be coupled to or integrated into a corresponding display device such as a standard or high definition television which is capable of xDSL communication with an internal or external xDSL modem.

The subscriber premises 10 may also include voice equipment 24 such as conventional telephones and fax machines that communicate using the voice channel. In one embodiment, each STB 20, voice equipment 24, and personal computer 28 is coupled to a splitter 26 which separates communications over the local loop 16 into a digital channel and a voice channel. Preferably, transmission priority is given to media or video data destined to be processed by the STB 20 rather than data destined to be processed by the personal computer 28. Also, real-time service to one device requiring real-time media processing should have priority over a non-real-time service to another device.

The central office 14 includes a splitter 30 to direct communications over the voice channel to the public switched telephone network (PSTN) 34 and to direct digital communications to a broadband network 36. A DSLAM 40, usually located at the central office 14, aggregates the incoming digital signals from the subscribers and de-multiplexes them. The DSLAM 40 transfers the aggregated communications to the public broadband network 36. However, the DSLAM 40 may be distributed into the public network 36.

At the subscriber premises 12, each STB 20 is coupled to a display device such as a standard definition (SD) or high definition (HD) television with a respective characteristic or set of characteristics. For a given digital video coding specification or video coding algorithm, the perceived picture fidelity, often referred to as perceived video quality, depends on several factors. A first set of factors influencing perceived picture quality is the inherent characteristics exhibited in the information of the video itself. Video being a sequence of pictures, such as those imaged by a video camera or scanned from film, exhibits information complexity that depends on the content of the imaged scene, including the motion of objects in the scene, the "speed of" and the "amount of" magnification exercised on the scene through the video or film generation process, the scene's lighting, and the spatial properties of the imaged objects in the scene, such as their respective textures, colors and shapes. Included in the inherent video characteristics is the native scan format of the video's pictures: either progressive or interlaced.

A second set of factors attributing to the perceived picture fidelity of video is a result of how the sequence of digitized pictures is compressed while exercising the video coding algorithm. The perceived picture quality is dependent on the spatial picture resolution and picture rate used in encoding the pictures, and the amount of compression effected by the video coding algorithm. In particular, the second set of factors' influence on perceived picture quality is directly correlated to the bit-rate of the compressed video. In one embodiment of the invention, the compression characteristics of the video include whether the video is compressed as a sequence of pictures in progressive scan format or interlaced scan format.

A third set of factors influencing the perceived video quality concerns the characteristics of the display device or television in which the video is displayed. A display device's characteristics include its picture rendering capabilities, the physical dimension characteristics of its screen, and its type of display. Picture rendering capabilities include the native spatial screen resolution, often called the native display resolution, in which the display device processes the information in the pictures to be displayed and emits or outputs them as visible light; the "displayed or output picture rate;" the aspect ratio of the physical screen or visual spatial area (e.g., 16:9 or 4:3), and whether the sequence of pictures are displayed in progressive or interlaced picture format.

A display device's picture rendering capabilities includes the real-time processing of the sequence of input pictures, for example, as provided real-time by STB 20 in decompressed form through a standardized physical interface that couples STB 20 and the display device, to systematically convert the sequence of input pictures to visible light according to its display characteristics. That is, the display device processes the sequence of input pictures to convert them spatially and temporally to its internal native display resolution, its output picture rate, its aspect ratio, and if necessary, to its native displayed picture format.

The physical screen is the surface where the information of each picture is effected into light for viewing by a subscriber. The physical screen's dimension and its shape (e.g., flat or elliptical) influences the suitable viewer's position and distance from the screen.

The type of display is characterized by one of the several technologies employed in its design for emitting the pictures corresponding to video or television signals as visible light. Display types include a cathode-ray tube (CRT) device, a plasma technology display, a liquid-crystal display (LCD), a digital light projection (DLP) display, liquid crystal on silicon (LCOS) technology, a display device based on nanotubes technology, a rear or front projection device based on internal processing of light, a display device incorporating optical processing mechanisms, or any combination of these technologies.

A fourth set of factors influencing the perceived picture quality of video concerns the characteristics (of STB20). Video is compressed according to the syntax and semantics of a particular video coding specification and transmitted to STB 20. Without any limitation to the invention, examples of video coding specifications include: "ISO/IEC 13818-2:2000 (E), Information technology—Generic coding of moving pictures and associated audio information: Video (second edition)," and "ISO/IEC 14496-10 AVC: Advanced video coding for generic audiovisual services (2003)."

Compressed pictures are decompressed by a video decompression engine or video decoder in STB 20 to counter the effects of the video compression algorithm on the compressed sequence of pictures and to reconstruct the pictures into displayable form. One or more two-dimensional arrays of picture elements or pixels correspond to the spatial resolution of a picture in displayable form. Reconstruction of a picture after its decompression typically results in storing its corresponding one or more two-dimensional arrays in a memory in STB 20 until the picture is displayed or until its information is no longer required for performing decompression and reconstruction of additional compressed pictures.

The characteristics of STB 20 may comprise the amount of resources it possesses or its capabilities to perform decompression for one or more of a plurality of digital video coding specifications (or video compression algorithms). For instance, a first STB 20 may possess limited amount of resources and be capable of decoding a first compressed video stream corresponding to a first instance of a first video program but incapable of decoding a second compressed video stream corresponding to a second instance of the first video program.

In one embodiment, the first compressed video stream requires less computational resources in performing video decompression on the first compressed video stream than on performing decompression on the second compressed video stream. The amount of resources required to decompress a video compressed according to a particular video coding specification may correspond to: an amount of memory, an amount of memory bus bandwidth (or memory bus access), a required memory speed, an amount or quantity of throughput or processing, a processor's speed or computational capability, a digital signal processor's speed or computational capability, a media processor's speed or computational capability, or a processor with the capability to perform one or more specific types of computations or instructions. As a non-limiting example, the amount of resources required to decompress a compressed video may correspond to STB 20 possessing capabilities to perform one or more real-time processing operations on picture data.

In an alternate embodiment, the first compressed video stream corresponds to one compressed according to the syntax and semantics of a first digital video coding specification and the video compressed video stream corresponds to one compressed according to the syntax and semantics of a second digital video coding specification. For instance, the first video coding specification may correspond to ISO/IEC 13818-2:2000 and the second coding specification to ISO/IEC 14496-10 AVC.

A fifth set of factors influencing the perceived picture quality of video concerns characteristics of local loop 16. Loop characteristics are known a priori and convey the maximum bit-rate for real-time transmission of a video program to a subscriber. Furthermore, the loop characteristics may change depending on the number from a plurality of subscribers being serviced by a first local loop that are simultaneously requesting or viewing video programs. STB 20 has a unique identification that allows a message to be transmitted to VHO 30 to communicate information pertaining to the characteristics of STB 20, the characteristics of the first local loop 16 coupling STB 20 to the VHO 330, and the characteristics of the display device coupled to STB 20.

The perceived picture quality by the subscriber is dependent on the combined effect of the first, second, third, fourth, and fifth sets of factors on the video. In alternate embodiments, one or more of the sets of factors, or portions thereof, may not contribute to the perceived picture quality.

The novel methods and systems described herein control, manage and optimize the transmission of a video program in compressed form to STB 20 by minimizing the consumption of the transmission channel's capacity. Specifically, the real-time transmission of the compressed video program is managed by lowering the bit-rate of the compressed video program to a level that does not degrade the perceived picture quality of the video beyond from what is capable of being provided by the display device coupled to STB 20, local loop 16, and/or by the processing capabilities of STB 20. The objective of the invention is to tailor the transmission of a video program to STB 20 as an individualized transmission, not wasting bandwidth unnecessarily. The video program is transmitted real-time in a sufficiently low bit-rate that provides at least the best perceived picture quality being capable of being provided or resolved by the ensemble comprised by the display device coupled to STB 20, local loop 16 and STB 20. Accordingly, the best perceived picture quality being capable of being provided or resolved is determined at VHO 330 from information related to the characteristics of the display device, STB 20, and/or local loop 16. Information related to one or more of these three different characteristics are either known at central office 14, VHO 330, or VSO 320, ahead of time or transmitted in one or more messages from STB 20 to a central office 14, VHO 330, or VSO 320 to manage the bit-rate in delivery of video programs to STB 20.

In a first embodiment, according to the characteristic or set of characteristics of a first display device coupled to a first STB 20, a first instance of a first video program is transmitted to the first STB 20. The first instance of the first video program exhibits one or more compression characteristics corresponding to one or more characteristics of the first display device. In particular, the compression characteristics of the first instance of the first video program are such that the spatial picture resolution, picture rate, or picture scan format, or any combination thereof, are modified from their corresponding original form at the time the video was created or imaged, in order to reduce the amount of information that must be compressed and transmitted to STB 20. The result is that the first instance of the first video program exhibits an increased amount of compression, or, equivalently, a lower bit-rate in its real-time transmission. However, the amount of modification of one or more video parameters in a compressed video from their corresponding original values at the time the video was imaged is according to the perceived picture quality that is capable of being provided by the display device, which in turn is dependent on the display device's characteristics. As a non-limiting example, an HD video program that was originally imaged at a 1920×1080 picture resolution may be compressed as a first compressed video stream or first instance, in which each picture is first reduced to a lower spatial resolution (e.g., 1440×1080) using signal processing methods, filters, and/or sample rate converters, and a second compressed video stream or second instance is compressed in its original spatial resolution (1920×1080).

Figure 3:
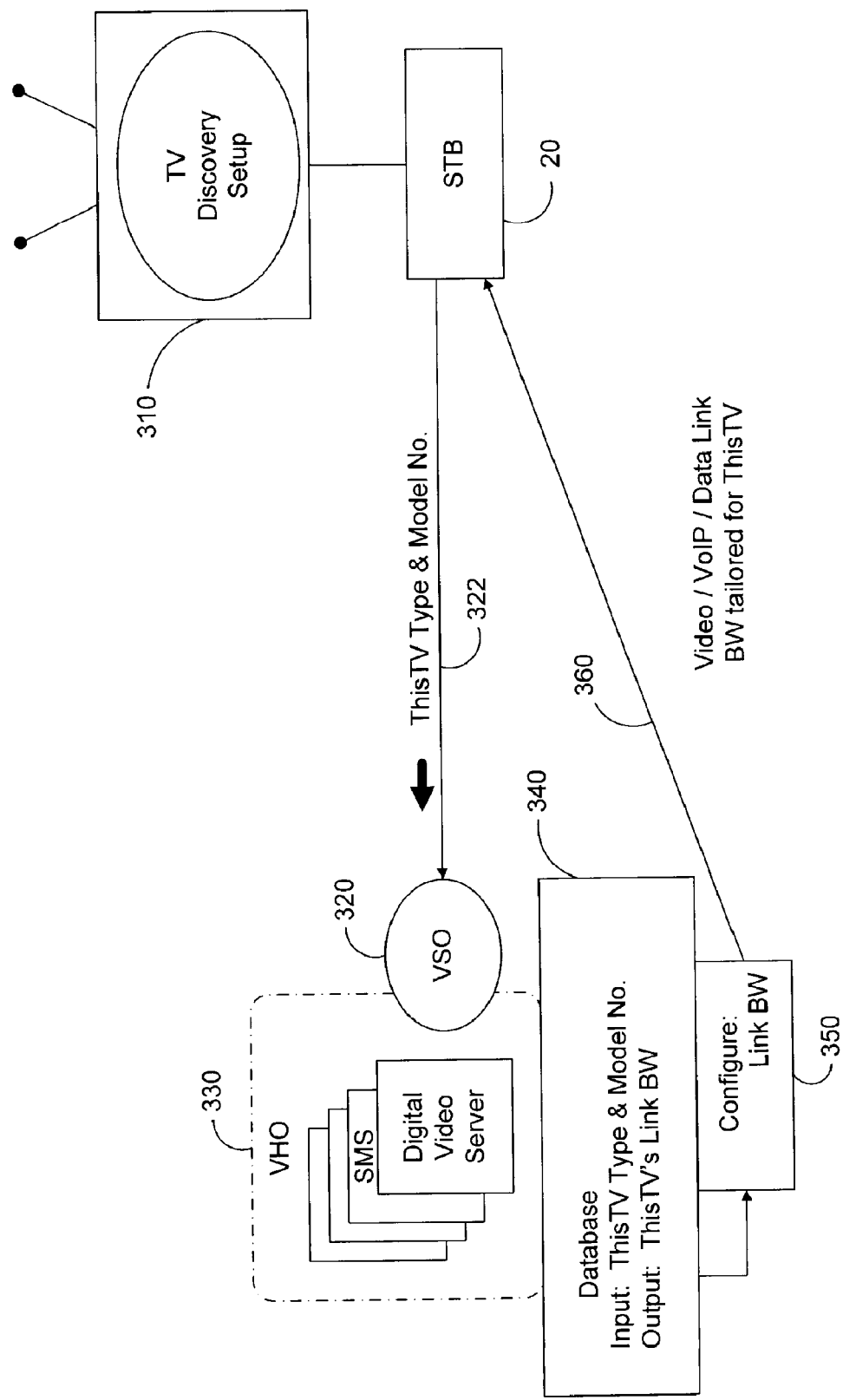
FIG. 3 illustrates one embodiment of implementing individualized bandwidth allocation according to the present invention.

As a non-limiting example, a first display device's characteristics may exhibit a native display resolution of 1280×1024. Upon or prior to receiving a request for viewing an HD video program, information corresponding to the display device coupled to STB 20 is transmitted by the STB 20 to VSO 320 or VHO 330, as shown in FIG. 3. Responsive to receiving the information corresponding to the display device, one or more computing devices cause retrieval of the display device's characteristics as necessary, if not already contained in the transmitted information or message from STB 20. The transmission of the first video program is effected by transmitting an instance of the requested HD video program as a compressed video stream in which compressed pictures have a spatial resolution that is lower than 1920×1080, resulting in a lower bit-rate. However, in order to match the perceived image quality capable of being provided by the display device, the first instance of the first video program has a spatial resolution in compressed form that is equal to 1280×1024, or one from a plurality of predetermined spatial resolution larger than or equal to 1280×1024 but smaller than 1920×1080. Alternatively, one from a plurality of compressed versions or instances of the first video program, each exhibiting a respective set of compression characteristics that is different from the others, is determined a priori to be the best match for the first display device according to the first display device's characteristics. Accordingly, real-time transmission of the first video program to STB 20 is effected with a compressed version or instance that was determined a priori to possess the best set of compression characteristics to match the first display device's capabilities while simultaneously resulting in a lower bit-rate.

As another non-limiting example, a first display device's characteristics may display pictures in an interlaced format, often called an interlaced display. Upon or prior to receiving a request for viewing a first video program that was natively imaged as progressive pictures at frame rates equal to or superseding the field rate of the first display device. For instance, the first video program may be a natively imaged program of 1280×720 (or 1920×1080) spatial resolution and 60 frames per second, whereas the first display device outputs pictures as interlaced pictures (or fields) at 60 Hertz. Information corresponding to the first display device coupled to STB 20 is transmitted by the STB 20 to VHO 330 or VSO 320, as previously described. The transmission of the first video program is effected by transmitting an instance of the requested video program as a compressed video stream in which compressed pictures are indicated as interlaced and having a total number of picture elements that is half of the native format of the first video program. Consequently, the bit-rate is significantly reduced from the compressed version of the first video program containing all the pixels of the native pictures in progressive format. Alternatively, one from a plurality of compressed versions or instances of the first video program, each exhibiting a respective set of compression characteristics that is different from the others, is determined a priori to be the best match for the first display device according to the first display device's rendering of interlaced pictures. Accordingly, real-time transmission of the first video program to STB 20 is effected with a compressed version or instance that was determined a priori to possess a best format of interlaced compressed pictures that match the first display device's interlaced rendering capabilities while simultaneously resulting in a lower bit-rate.

In an alternate embodiment, a compressed version of the first video program is selected for transmission to STB 20 according to the first display device's characteristics and according to the characteristics of STB 20. For instance, if STB 20 is capable of receiving a compressed video stream corresponding to a second video specification that provides superior compression in comparison to a first video coding specification, the first video program is transmitted to STB 20 as a compressed version that matches the first display device's characteristics and according to the syntax and semantics of the second video specification. On the other hand, if STB 20 is capable of decompressing compressed video streams corresponding to the first video specification, the transmitted video stream is one that matches the first display device's characteristics and according to the syntax and semantics of the first video specification.

In yet another embodiment, a compressed version of the first video program is selected for transmission to STB 20 in accordance with the first display device's characteristics, the characteristics of STB 20, and the inherent video characteristics of the first video program.

In yet another embodiment, a compressed version of the first video program is selected for transmission to STB 20 in accordance with the first display device's characteristics and the characteristics of local loop 16.

In yet another embodiment, a compressed version of the first video program is selected for transmission to STB 20 in accordance with the first display device's characteristics, the characteristics of STB 20, and the characteristics of local loop 16.

In yet another embodiment, a compressed version of the first video program is selected for transmission to STB 20 in accordance with the first display device's characteristics, the characteristics of STB 20, the inherent video characteristics of the first video program, and the characteristics of local loop 16.

In yet another embodiment, a compressed version of the first video program is selected for transmission to STB 20 in accordance with the first display device's characteristics, the inherent video characteristics of the first video program, and the characteristics of local loop 16.

In yet another embodiment, a compressed version of the first video program is selected for transmission to STB 20 in accordance with the characteristics of STB 20 and the characteristics of local loop 16.

In yet another embodiment, a compressed version of the first video program is selected for transmission to STB 20 in accordance with the characteristics of STB 20, the inherent video characteristics of the first video program, and the characteristics of local loop 16.

In yet another embodiment, a compressed version of the first video program is selected for transmission to STB 20 in accordance with the inherent video characteristics of the first video program and the characteristics of local loop 16.

In a second embodiment, a first display device is coupled to a first STB 20 and a second display device is coupled to a second STB 20 (not shown). The first STB 20 is coupled to a first loop 16 and second STB 20 is coupled to a second loop 16. A first request for the first video program (e.g., effected by a television channel change or as a movie purchase) is generated from the first STB 20 and a second request for the first video program is generated from the second STB 20. Responsive to the first request for the first video program, a first instance of the first video program is transmitted to the first STB 20 and responsive to the second request for the first video program, a second instance of the first video program is transmitted to the second STB 20, the compression characteristics of the first instance of the first video program in compressed form being different than the compression characteristics of the second instance of the first video program in compressed form. The compression characteristics of the first instance of the first video program in compressed form are determined according to information transmitted from the first STB 20, or known ahead of time, and according to one or more of the first display device's characteristics, the characteristics of the first local loop 16, the characteristics of the first STB 20, and the inherent video characteristics of the first video program. The compression characteristics of the second instance of the first video program in compressed form are determined according to information transmitted from the second STB 20 and according to one or more of the second display device's characteristics, the characteristics of the second local loop, the characteristics of the second STB 20, and the inherent video characteristics of the first video program.

In a third embodiment, the first and second instance of the first video program in compressed form differ only when transmitting the first video program, or any portions thereof, simultaneously in real-time to the first STB 20 and the second STB 20.

In a fourth embodiment, the first and second instance of the first video program in compressed form do not differ when transmitting the first video program, or any portions thereof, simultaneously in real-time to the first STB 20 and the second STB 20. The compression characteristics of the common instance of the first video program in compressed form are determined according to information transmitted from the first STB 20 and the second STB 20 and according to one or more of the first display device's characteristics, the characteristics of the first STB 20, the second display device's characteristics, the characteristics of the second STB 20, and the inherent video characteristics of the first video program.

In a fifth embodiment, a first display device coupled to a first STB 20 possesses capabilities for displaying pictures only in a progressive scan format and the first video program possesses a native interlaced picture scan format. The first instance of the first video program in compressed form is such that the native interlaced pictures are first deinterlaced prior to compression and compressed as progressive pictures according to one from possibly several video coding specifications. The de-interlaced method performed in the interlaced pictures is performed a priori to match one or more compression versions or instances of the first program to display devices that render in a native progressive picture format. Given the low cost nature of consumer electronic devices like televisions and display devices, their built-in de-interlacing mechanisms are often compromised. By employing a superior de-interlacing mechanism, one that is not cost nor resources constrained, compression of pictures is effected on the deinterlaced version of the interlaced pictures.

In a sixth embodiment, the first STB 16 and the second STB 16 are coupled to the first local loop 16. In accordance to the characteristics of the first local loop 16, the first instance of the first video program in compressed form is transmitted to the first STB 20 as a third instance of the first video program when the first video program, or any portions thereof, is transmitted in real-time to the first STB 20 simultaneously with the transmission of any video program in compressed form to the second STB 20. The bit-rate and compression characteristics of the third instance of the first video program in compressed form differ from the bit-rate and compression characteristics of the first instance of the first video program in compressed form. The first instance of the first video program in compressed form is employed for real-time transmission to the first STB 20 only when the first video program, or parts thereof, is not being transmitted in real-time to the first STB 20 simultaneously with the transmission of any video program in compressed form to the second STB 20.

As a non-limiting example of how the display characteristics affect perceived picture quality, as the native display resolution and/or the display device's physical screen dimension decreases, the video resolution required to maintain constant video quality as perceived by the subscriber is also reduced. Therefore, the digital data rate to maintain a perception of a video picture quality that is consistent with a lower picture quality induced by the display device coupled to STB 20 is controlled according to the display device's characteristics. A lower bit rate for a video program is thus attainable by transmitting a video program to STB 20 at a decreased bit-rate, for instance, obtained by encoding the picture at a lower spatial resolution or frame rate that is consistent with the particular display device's characteristics. The bit-rate of a video program decreases as the television's picture quality capability decreases. This relationship applies for both SD and HD video.

Figure 2:
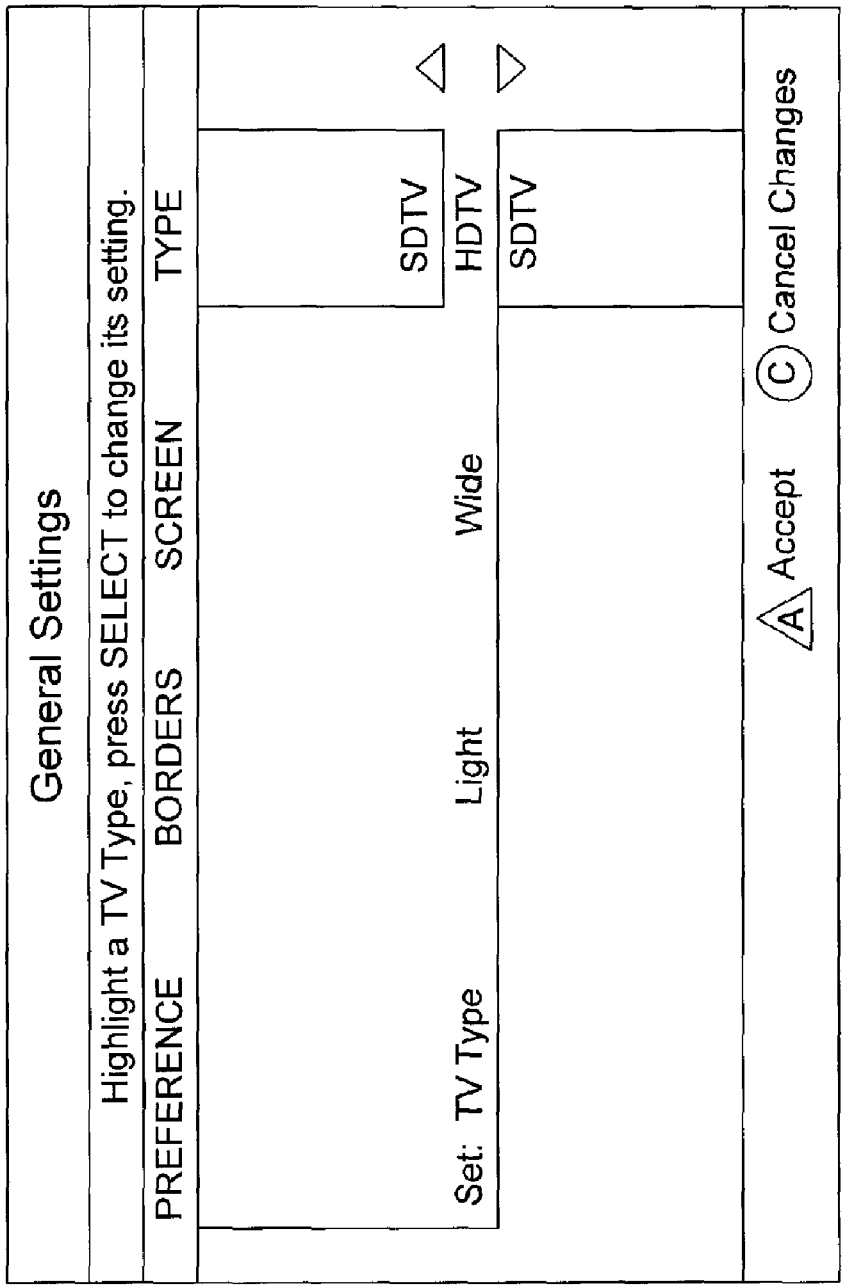
FIG. 2 illustrates a screen-shot of a graphical user interface screen depicting a selectable item.

Some STBs, such as Scientific-Atlanta's HD set-tops, query television display attributes. Information relating to the type of display and resolution of the display are stored in the STB connected to the television. At the time of the installation of the STB, the type of display, such as SD, HD, or other, one or more display characteristics and the size of the display can be required to be entered into the STB. As a non-limiting example, a display characteristic can be a display's manufacturer, display model number, manufacturer's product serial number, or product series. The type of display can also be entered, being for example a plasma, CRT, LCD, LCos, DLP, front projection, rear projection, or other, or any combination of theses. FIG. 2 illustrates a screen-shot of one example of a graphical user interface screen depicting the type of television as a selectable item as part of the discovery setup of the STB such as the discovery system and method described in U.S. patent application Ser. No. 10/761,777, titled "Interactive Discovery of Display Device Characteristics", filed Jan. 21, 2004, which is incorporated herein by reference. In one embodiment, buttons on the remote control can be used to highlight and select whether the television is SD or HD. Other attributes which may be queried may include the television's model number or aspect ratio. This information can be used to determine display resolution. Alternatively, the display attributes or characteristics can be queried directly from the STB. With the appropriate information stored in each STB, an identifying tag related to the display screen size can be used each time a request is made to provide programming.

However, the required digital data rate to maintain a perception of constant video picture quality by the subscriber is also dependent on the type of content received at the television. For example, sports events require a higher digital data rate than do movies because of differences in the amount of motion and detail between the two types of content. News programs have lower detail and motion than sports events and, therefore, allow lower digital data rates for video than for sports events in order to have similar perception of video picture quality. One embodiment which may be utilize to ascertain the type of content currently being viewed is to utilized metadata associated with the content that was created for distinguishing types of content. This metadata may be manually coded and associated with each particular program instance by the local operator or by the programmer.

FIG. 3 illustrates one embodiment of the present invention for implementing individualized link bandwidth allocation. First, the STB 20 initiates the discovery process to provide the display attributes of the display 310 to a video serving office (VSO) 320 of the central office 14 that typically includes video transport equipment. In particular, the monitor or television type as well as the model number could be provided as shown on branch 322. A video hub office (VHO) 330, typically separate from the central office 14, includes a database 340 which receives the television type and model number as input. Alternatively, the identifying tag related to the display screen size and one or more display characteristics of a particular link, stored in database 340 can be used each time a request is made to provide programming. Also, the metadata corresponding with a requested program instance may also be forwarded to the VSO 320 and VHO 330. From the database 340, the link bandwidth for the specific display 310 and/or the currently viewed program instance is configured as shown in block 350. Branch 360 depicts a video/VoIP/data link back to the STB 20 which is tailored to the display 310. Because a link is tailored to a display associated with each STB, a particular program instance may be viewed on different size displays at different rates while maintaining a constant video quality perception.

Recently new functionality has been added to conventional STTs—namely the ability to record an incoming video stream in digitized form onto a mass storage device, such as a hard disk drive, and play back that recorded video as desired by the user. This functionality has become known as a "digital video recorder" (DVR) or personal video recorder (PVR) and is viewed as a superior alternative to conventional video tape recorders for capture and subsequent playback of programming content. DVR settops allow a subscriber to view recorded video rather than view real-time video.

Simultaneous viewing and recording of the same video content may not happen frequently. If a DVR settop is being used, logic within the DVR settop can be used to determine if incoming video signals are being recorded, but not being simultaneously viewed. The data rate for storing material on a hard drive that is not simultaneously being viewed can be reduced below the real-time rate to reduce the traffic load to that subscriber. Although the time to complete storage of a given program will then be lengthened, the playback rate can be in real-time and the desired video resolution can be preserved. Therefore, non-real-time recording at lower data rates optimizes the overall data rate to each subscriber. DVR capability is another characteristic communicated by STB 20 to the VSO 320 or the VHO 330, for example, for attaining bandwidth management.

Figure 4:
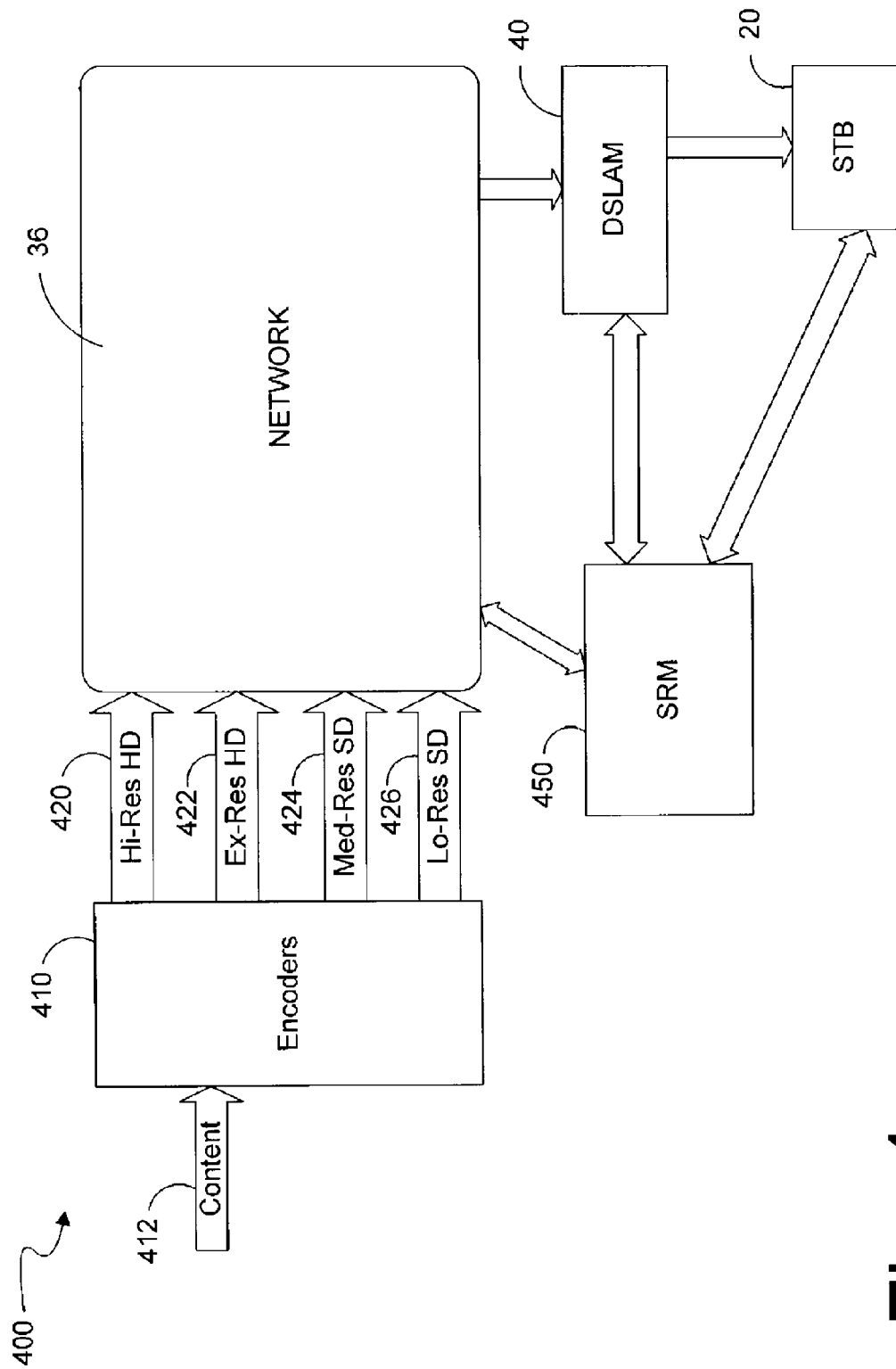
FIG. 4 illustrates a video system capable of providing discrete resolutions and data rates according to one embodiment of the present invention.

FIG. 4 illustrates a video system 400 capable of providing several discrete resolutions and data rates. The video system 400 includes video encoders 410 for receiving content 412. Encoders 410 convert the content 412 into multiple resolutions and bit rates. For example, as shown in FIG. 4, encoders 410 generate high resolution HD and enhanced-resolution HD streams 420 and 422, respectively, and medium resolution SD and low resolution SD streams 424 and 426, respectively. Video steams 420, 422, 424, and 426 are multicast across the broadband network 36 to the DSLAM 40. In one embodiment, the video system 400 may be configured to include digital content managers (DCMs) as part of the network 36. Each DCM is a specialized hardware based server for video content management that provides transrating for each DSL link which is the ability to dynamically recode the video to lower data rates. Each DCM also provides multiplexing and encryption for each DSL link.

The video system 400 also includes a system resource manager (SRM) 450 which may be implemented at a server of the VSO 320, VHO 330, or distributed in the network 36. The SRM 450 includes a map to identify each STB which is periodically updated so that the SRM 450 can track the bandwidth utilization on each of the DSL links to each of the subscribers. The SRM 450 allocates bandwidth preferably based on rules defined at a policy server at the central office 14 in order to prevent the DSL link from being oversubscribed. These rules are preferably based at least in part on allotted bandwidth per subscriber, display screen sizes, and content type. For example, the bandwidth per client may be managed as shown in FIG. 5.

The SRM 450 manages bandwidth allocation to a plurality of subscribers by utilizing opportunistic bandwidth to preclude oversubscription. For example, the SRM 450 tracks bandwidth utilization on multiple links to one or more subscribers and selects data rates on one or more of the links that optimizes the bandwidth to each of the subscribers. The bandwidth to a subscriber may be optimized by reducing a data rate on one or more links to that subscriber to allow the total bandwidth to that subscriber to be maintained at a desired amount or to allow an increased data rate to one or more other links to that subscriber. In another embodiment, the SRM 450 may detect that packets are being dropped to one or more subscribers along one or more links. In such case, the SRM 450 may select a data rate to meet the available bandwidth to the subscriber. For example, the SRM 450 may select a reduced data rate along the one link having the dropped packets or alternatively select a reduced rate along another link to the same subscriber.

Also, in order to optimize bandwidth, when the STB 20 requests a video service, the display type of the display coupled to the STB 20 requesting service is reported by the STB 20 along its link, or retrieved from storage at the central office 14, along with the DSL link identification, to the SRM 450. Therefore, the SRM 450 selects the optimum data rate stream for that particular display type that meets the available bandwidth. Because a link may be tailored to a particular display associated with each STB, the data rate to the display may be reduced to permit a higher data rate along another link to the subscriber that meets available bandwidth to that subscriber. Also, because a non-real-time stream may be used to reduce the traffic load, another link may utilize a higher data rate that meets available bandwidth requirements.

Figure 6:
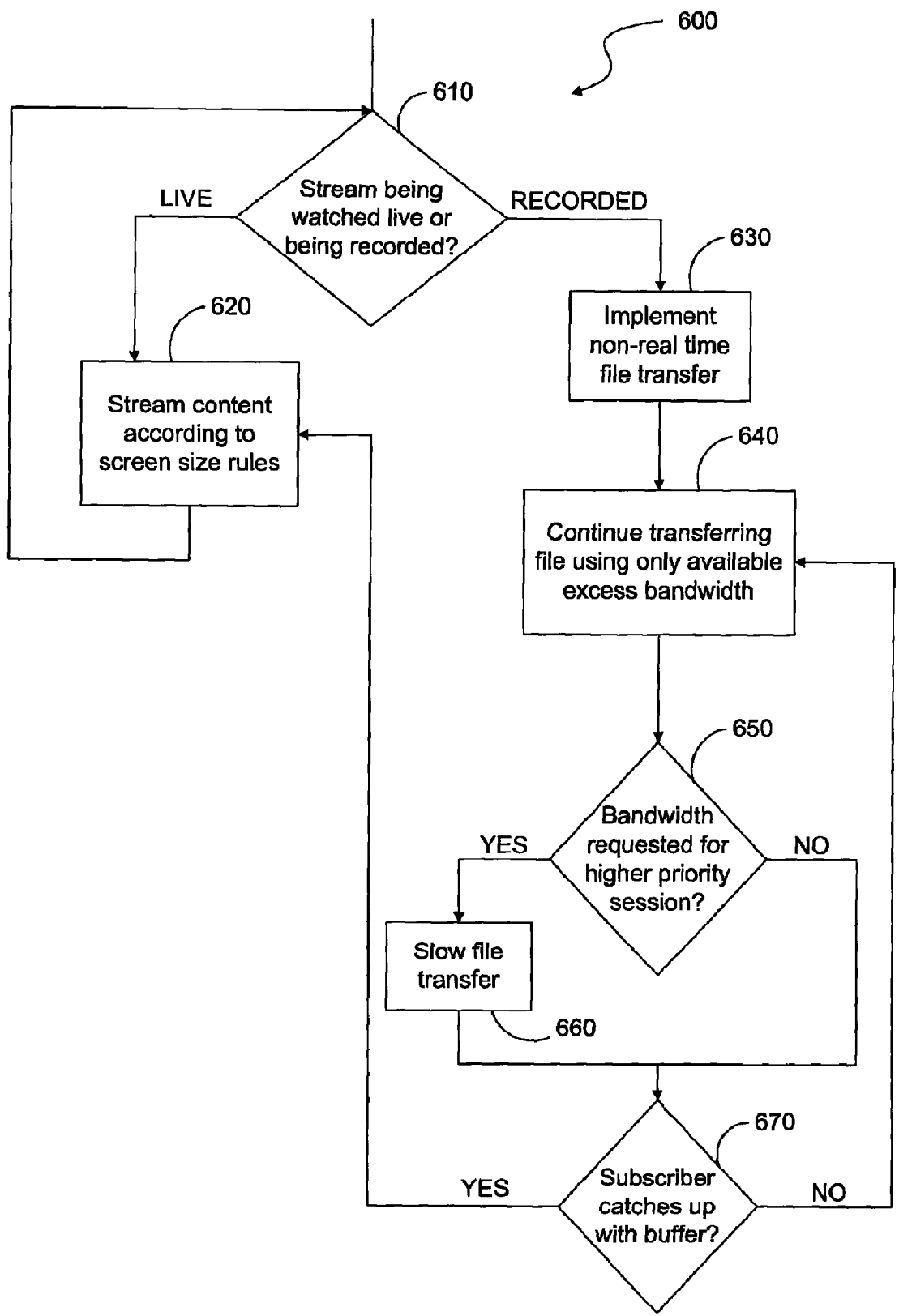
FIG. 6 illustrates a process for optimizing bandwidth utilization when commencing a video session according to one embodiment of the present invention.

Scheduled DVR recordings may use an elastic buffer in the network 36 and use opportunistic bandwidth. FIG. 6 illustrates one embodiment of a process 600 of the present invention for optimizing bandwidth utilization when a video session is initiated by a DVR capable device. The process 600 begins at decision block 610 where it is determined whether a particular stream is being watched live by the subscriber or if it is being recorded. If the stream is being watched live, the content is streamed according to rules based upon the screen size and/or the type of content as shown in process block 620. On the other hand, if the stream is being recorded, but not being simultaneously watched, then a non-real-time file transfer is implemented utilizing a buffer of X minutes, rather than real-time streaming as shown in process block 630. As shown in process block 640, if the stream is not being viewed, transfer of the file is continued using only available excess bandwidth in the transmission line. However, as shown in decision block 650, the process 600 determines whether there is a request for a higher priority session while non-real-time file transfer is being implemented. If a higher priority session is requested, such as real-time viewing of a different video signal in HD, the file transfer may be slowed as shown in process block 660. See U.S. patent application Ser. No. 09/590,521, titled Systems and Method for Adaptive Scheduling and Dynamic Bandwidth Resource Allocation Management in A Digital Broadband Delivery System, filed Jun. 9, 2000, which is incorporated herein by reference. After the file transfer has been slowed as a result of the request for the higher priority session, or if the higher priority session has not been requested at all, the process 600 would continue to decision block 670 to determine whether the subscriber, if viewing content from the buffer, has caught up with the recorded content from the buffer. If the subscriber has caught up, the YES branch is followed back to process block 620 where the content is streamed according to the screen sizes. On the other hand, if subscriber has not yet caught up with the content from the buffer, then the process follows the NO branch back to process block 640 where the transfer is continued using only available excess bandwidth.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for optimizing bandwidth utilization to a subscriber premises, the method comprising:
 receiving at a location remote from a settop attributes of a display device ascertained through the settop, the display device capable of providing up to a predetermined level of perceived picture quality;
 generating at the location remote from the settop a plurality of compressed versions of video content, wherein each of the compressed versions of content exhibits a set of compression characteristics that is different from the others;
 determining at the location remote from the settop which version of the plurality of compressed versions of video content has the set of compression characteristics most optimal for the display device, wherein the most optimal set of compression characteristics includes a data rate of the video content sufficient to provide a defined predetermined perceived picture quality of the video content to be displayed on the display device based upon the attributes, wherein the determined data rate does not degrade the predetermined level;

receiving at a system resource manager a request for the video content from the settop, wherein the request for the video content includes an identifying tag related to the attributes, the request transmitted from the settop to the system resource manager, the system resource manager configured to manage bandwidth allocation;

receiving by the system resource manager the attributes stored in a database corresponding to the system resource manager, the attributes received responsive to indexing based on the identifying tag;

selecting the version of the video content having the set of compression characteristics most optimal for the display device;

allocating bandwidth for transmission of the selected version of the video content so that the predetermined level is maintained; and receiving metadata within the video content, the metadata corresponding to a type of the video content, the type of video content requiring a different compression computational complexity between a first content type and a second content type, wherein the determining, selecting, and allocating are further based on the metadata.

2. The method of claim 1, wherein the attributes comprise display size, native scan format, aspect ratio, and type of the display device and the selecting comprises selecting the set that results in decreasing the data rate and preserving a spatial resolution corresponding to the video content as a result of receiving the ascertained attributes.

3. The method of claim 1, wherein the attributes comprise display size, native scan format, aspect ratio, and type of the display device and the selecting comprises selecting the set that results in decreasing the data rate and reducing a spatial resolution corresponding to the video content as a result of receiving the ascertained attributes.

4. The method of claim 1, wherein the attributes comprise one or more of type of the display device, model number of the display device, and aspect ratio of a physical screen of the display device.

5. The method of claim 1, wherein the system resource manager determines, selects and allocates the data rate of the video content based upon the attributes during said determining, selecting and allocating.

6. The method of claim 1, wherein the steps of determining, selecting and allocating further comprise the system resource manager tracking bandwidth utilization on multiple links and selecting a data rate of the video content based upon the attributes on one of said links.

7. The method of claim 1, wherein the determining, selecting, and allocating further comprise the system resource manager determining a native scan format of the video content as a raw video source, and responsive to determining that the native scan format is progressive and responsive to receiving the attributes that indicate that the display device comprises an interlaced scan format, selecting the version with an interlaced scan format having a quantity of picture elements that are half of the picture elements of the native scan format.

8. The method of claim 1, further comprises receiving metadata associated with the video content, the metadata corresponding to a type of the video content, the type of video content requiring a different compression computational complexity between a first content type and a second content type, wherein the determining, selecting, and allocating are further based on the metadata.

9. A system for optimizing bandwidth utilization to a subscriber premises, the system comprising:

an encoder configured to generate at the location remote from a settop a plurality of compressed versions of video content, wherein each of the compressed versions of content exhibits a set of compression characteristics that is different from the others;

a system resource manager configured to allocate bandwidth, the system resource manager located remotely from the settop, the system resource manager further configured to:

receive attributes of a display device ascertained through the settop, the display device capable of providing up to a predetermined level of perceived picture quality;

determine at the location remote from the settop which version of the plurality of compressed versions of video content has the set of compression characteristics most optimal for the display device, wherein the most optimal set of compression characteristics includes a data rate of the video content sufficient to provide a defined predetermined perceived picture quality of the video content to be displayed on the display device based upon the attributes;

select the version of the video content having the set of compression characteristics most optimal for the display device;

allocate bandwidth for transmission of the selected version of the video content so that the predetermined level is maintained; and receive metadata within the video content, the metadata corresponding to a type of the video content, the type of video content requiring a different compression computational complexity between a first content type and a second content type, wherein the determining, selecting, and allocating are further based on the metadata.

* * * * *